United States Patent
Beyme et al.

(10) Patent No.: US 7,286,802 B2
(45) Date of Patent: Oct. 23, 2007

(54) WIRELESS SIMULATOR

(75) Inventors: Steffen Beyme, Vancouver (CA); Chris Kilgour, White Rock (CA); Todd Sankey, Vancouver (CA)

(73) Assignee: Dyaptive Systems Incorporated (CA)

( * ) Notice: Subject to any disclaimer, the term of this patent is extended or adjusted under 35 U.S.C. 154(b) by 715 days.

(21) Appl. No.: 10/366,619

(22) Filed: Feb. 14, 2003

(65) Prior Publication Data

US 2003/0236089 A1    Dec. 25, 2003

Related U.S. Application Data

(60) Provisional application No. 60/356,728, filed on Feb. 15, 2002.

(51) Int. Cl.
*H04B 17/00* (2006.01)

(52) U.S. Cl. .................. 455/67.14; 455/423; 455/424; 455/436; 455/67.11; 455/67.16; 455/466

(58) Field of Classification Search ................ 455/423, 455/424, 436, 67.11, 67.14, 67.16; 370/401, 370/336
See application file for complete search history.

(56) References Cited

U.S. PATENT DOCUMENTS

| | | | |
|---|---|---|---|
| 4,631,363 A * | 12/1986 | Foster et al. .............. 379/15.01 |
| 5,359,649 A * | 10/1994 | Rosu et al. ............. 379/221.07 |
| 5,471,649 A * | 11/1995 | Rees et al. ................ 455/67.14 |
| 5,481,588 A * | 1/1996 | Rickli et al. ............. 379/32.01 |
| 5,539,772 A | 7/1996 | Fasulo, II et al. |
| 5,596,570 A | 1/1997 | Soliman |
| 5,627,834 A * | 5/1997 | Han et al. .................... 370/241 |
| 5,675,581 A | 10/1997 | Soliman |
| 5,768,689 A * | 6/1998 | Borg ........................ 455/67.14 |
| 5,794,128 A * | 8/1998 | Brockel et al. .......... 455/67.11 |
| 5,987,306 A * | 11/1999 | Nilsen et al. ............ 455/67.11 |
| 6,058,261 A | 5/2000 | Rapeli |
| 6,118,982 A * | 9/2000 | Ghisler et al. ........... 455/67.14 |
| 6,272,450 B1 | 8/2001 | Hill et al. |
| 6,351,455 B1 | 2/2002 | Thayer et al. |
| 6,430,410 B1 * | 8/2002 | Staber ........................ 455/423 |
| 6,662,008 B1 * | 12/2003 | Dolan et al. ................ 455/423 |
| 6,711,147 B1 * | 3/2004 | Barnes et al. ............... 370/338 |
| 6,788,934 B2 * | 9/2004 | Keenan et al. .............. 455/424 |
| 6,940,838 B1 * | 9/2005 | Stead ........................ 370/335 |

FOREIGN PATENT DOCUMENTS

| | | |
|---|---|---|
| WO | WO96 02987 A | 2/1996 |
| WO | WO99 52314 A | 10/1999 |
| WO | PCT/US01/22882 | 4/2001 |
| WO | WO 02 09313 A | 1/2002 |

* cited by examiner

*Primary Examiner*—Marceau Milord

(57) ABSTRACT

There is disclosed a simulator for mobile terminals within the context of a wireless network, for the purpose of testing the basestations. Channel impairments are effect during baseband processing.

69 Claims, 10 Drawing Sheets

Complex Deployment Arrangement

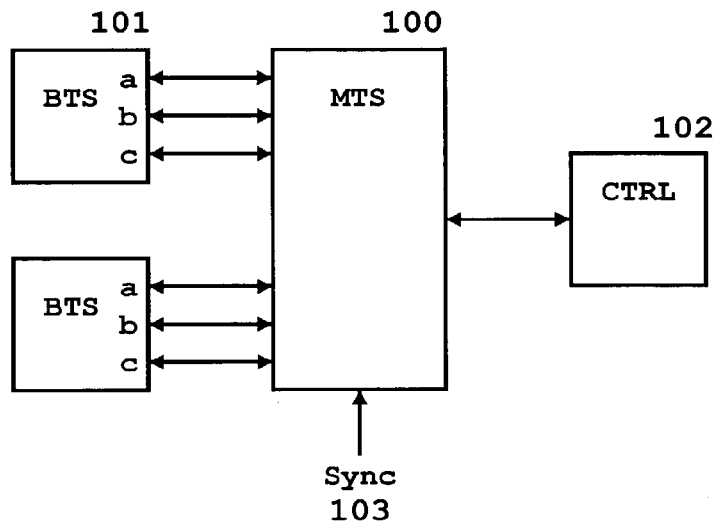
Figure 1 - Basic Deployment Arrangement
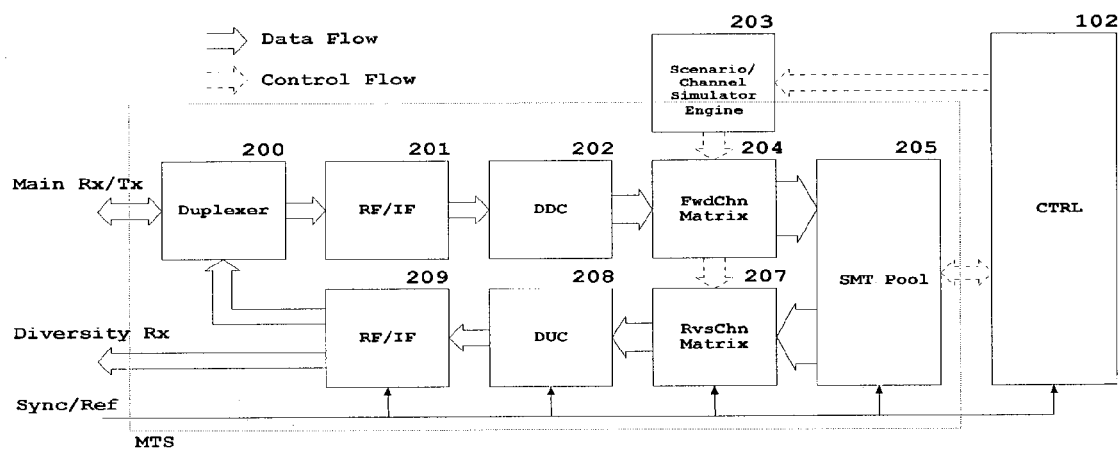
Figure 2 - Functional Architecture of MTS and CTRL

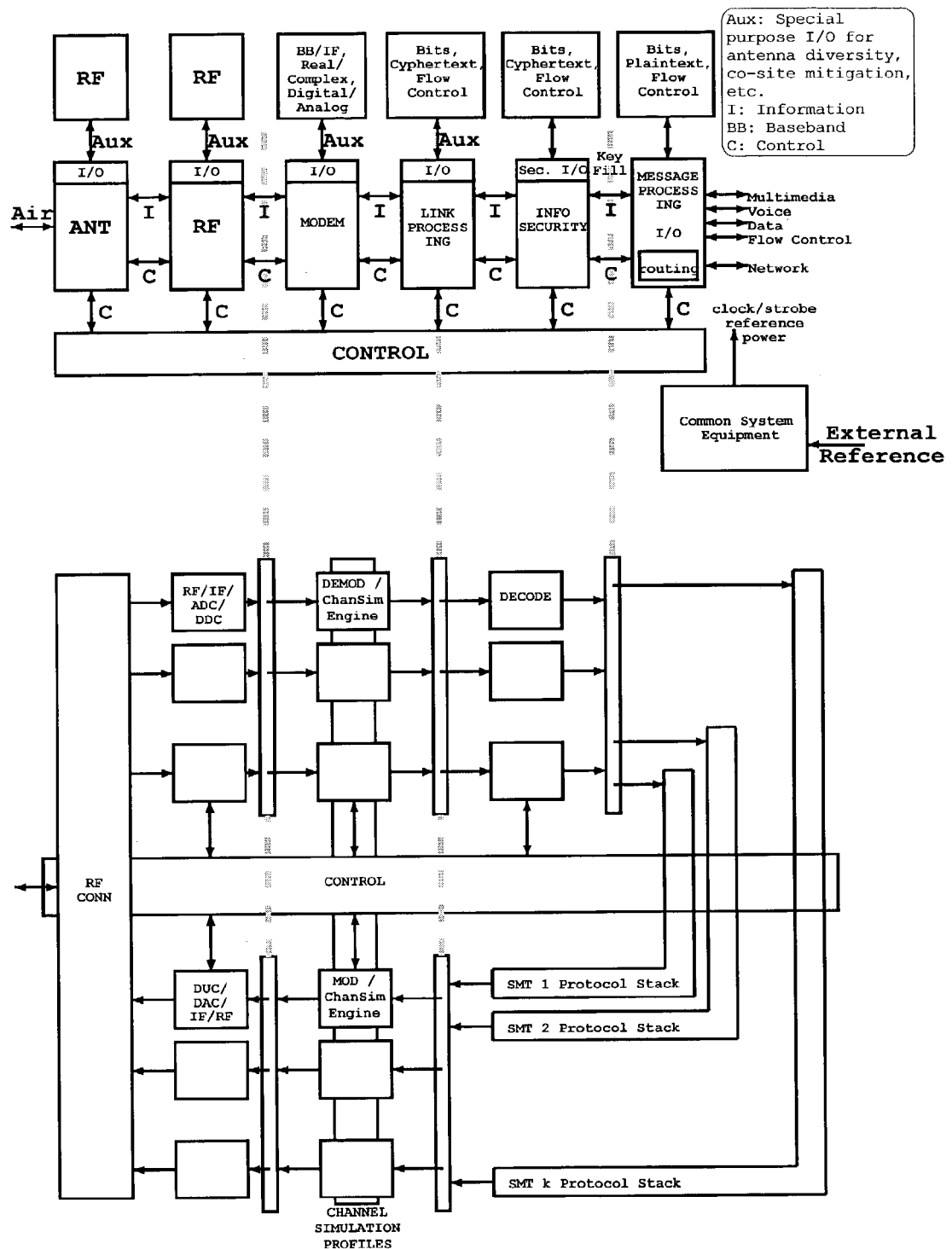
Figure 3 - Functional Block Diagram Aligned with SDR Functions

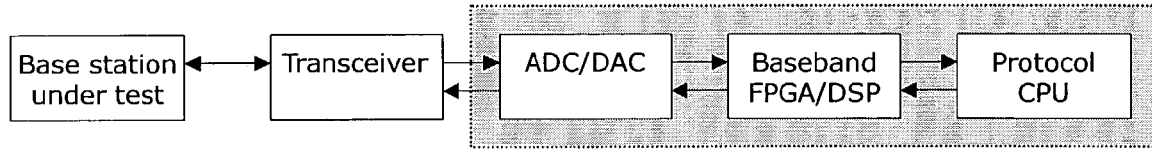
Figure 4 - Ideal SDR Platform for MTS
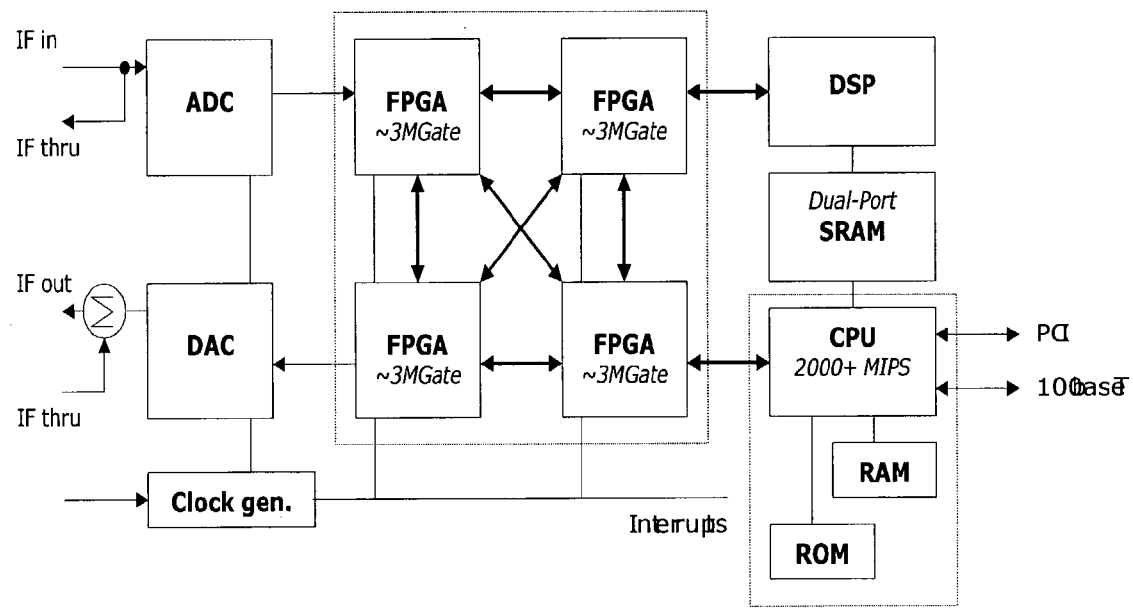
Figure 5 - SDR Hardware Resources for MTS

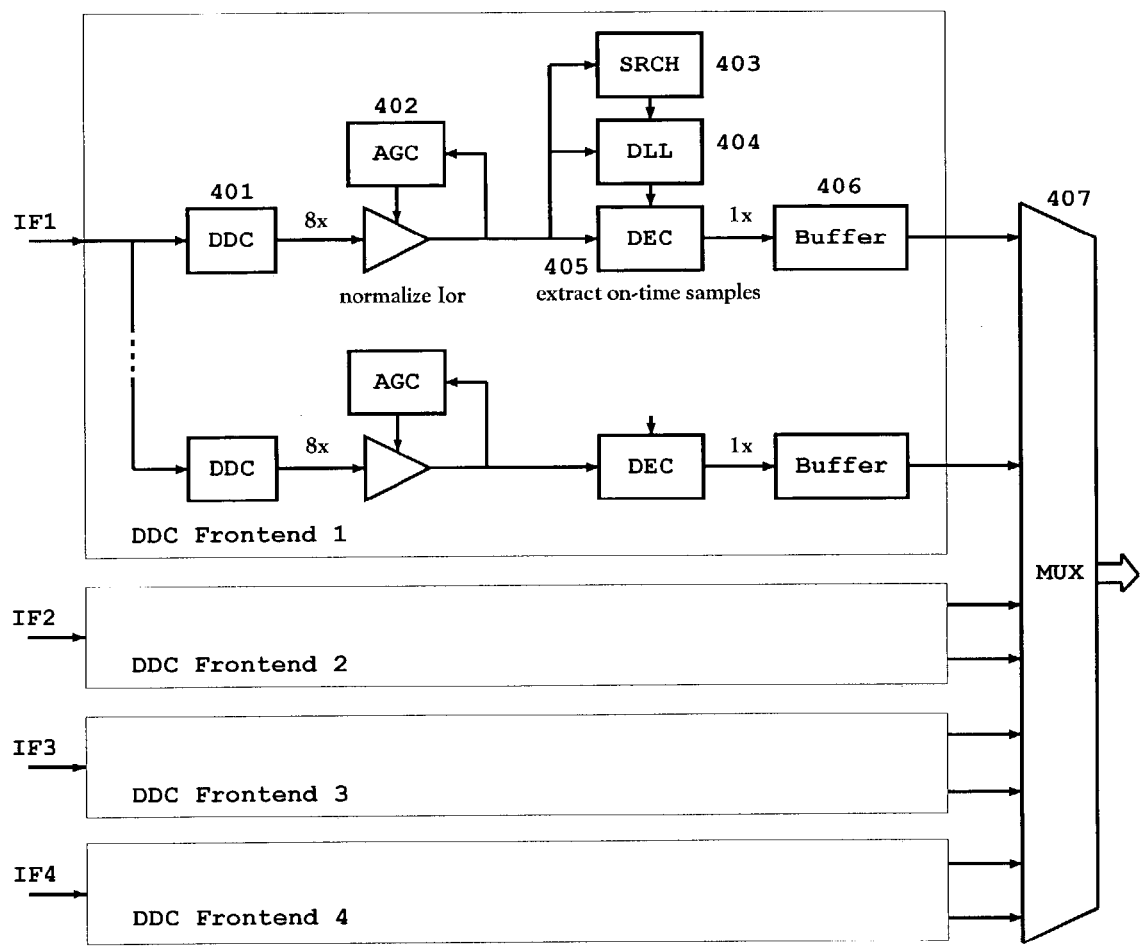
Figure 6 - Forward Link Front-End Processing

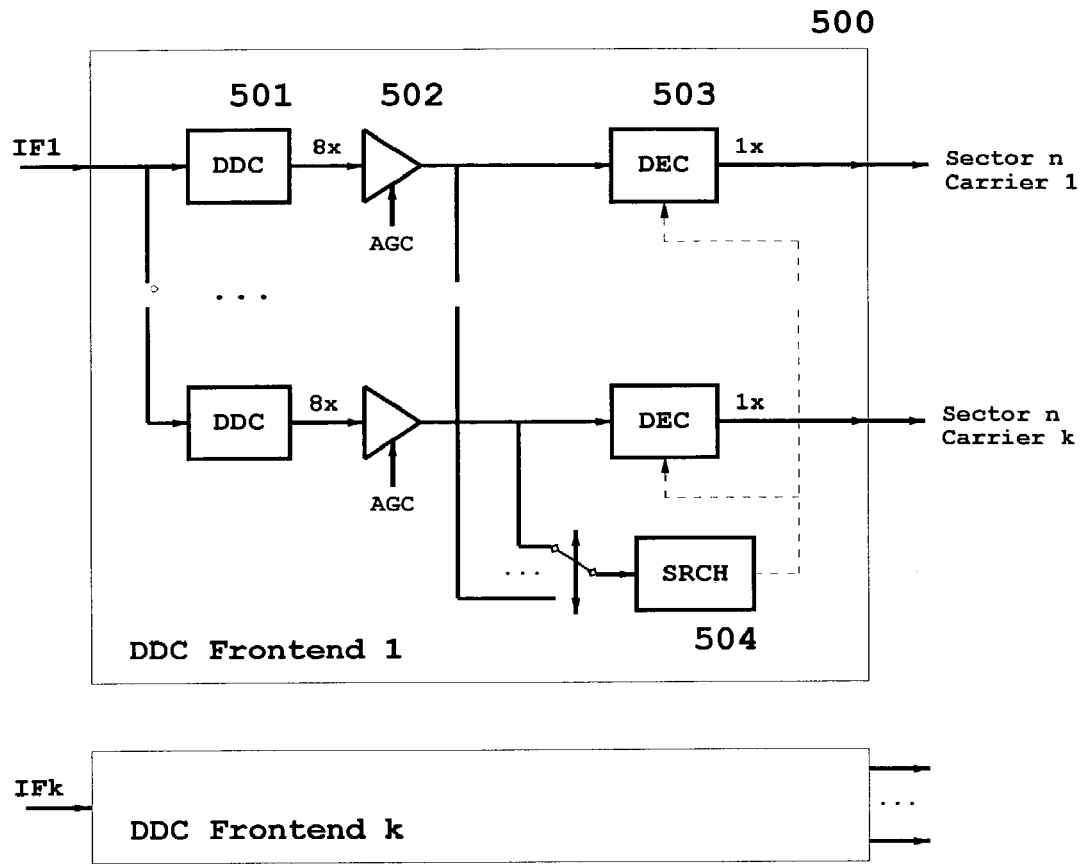
Figure 7 - Forward Link Alternate Front-End Processing
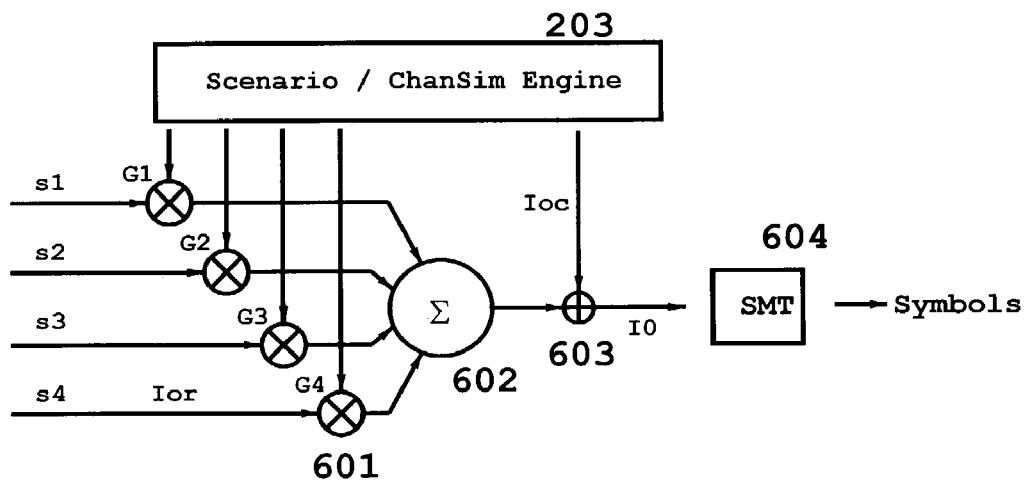
Figure 8 - Forward Link Channel Simulation Concept with Chip Rate Signal Processing

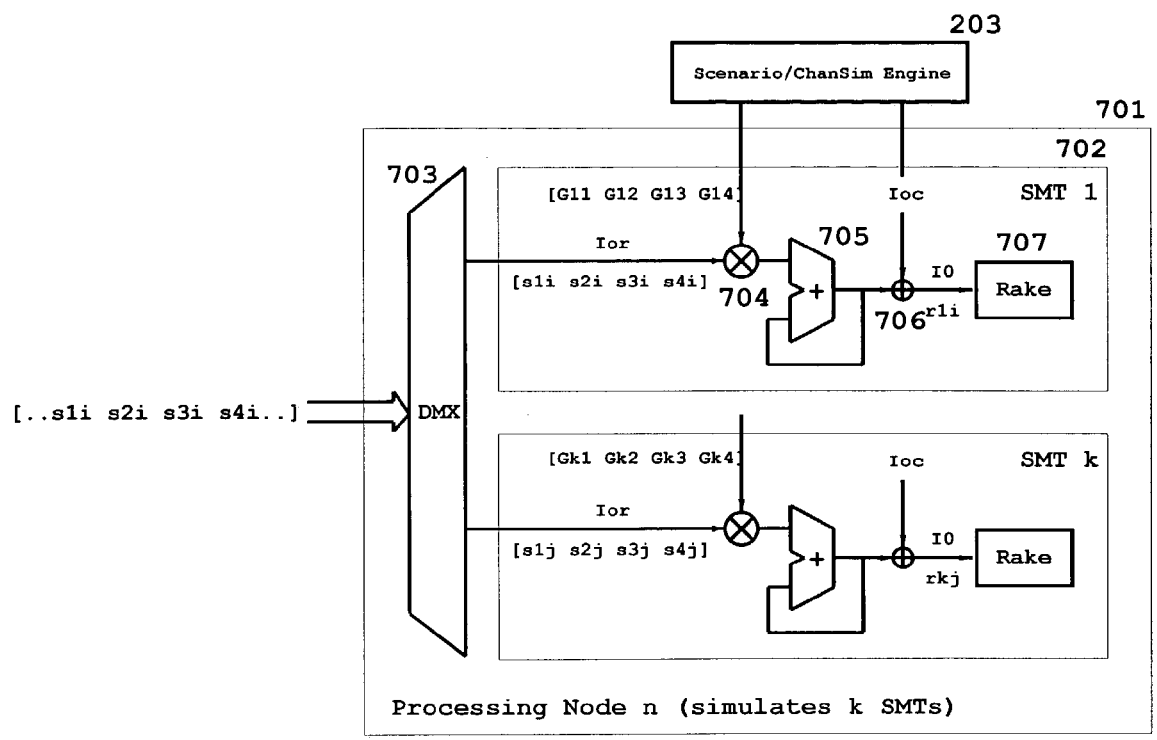
Figure 9 - Forward Link Channel Simulation Implementation with Chip Rate Signal Processing Option

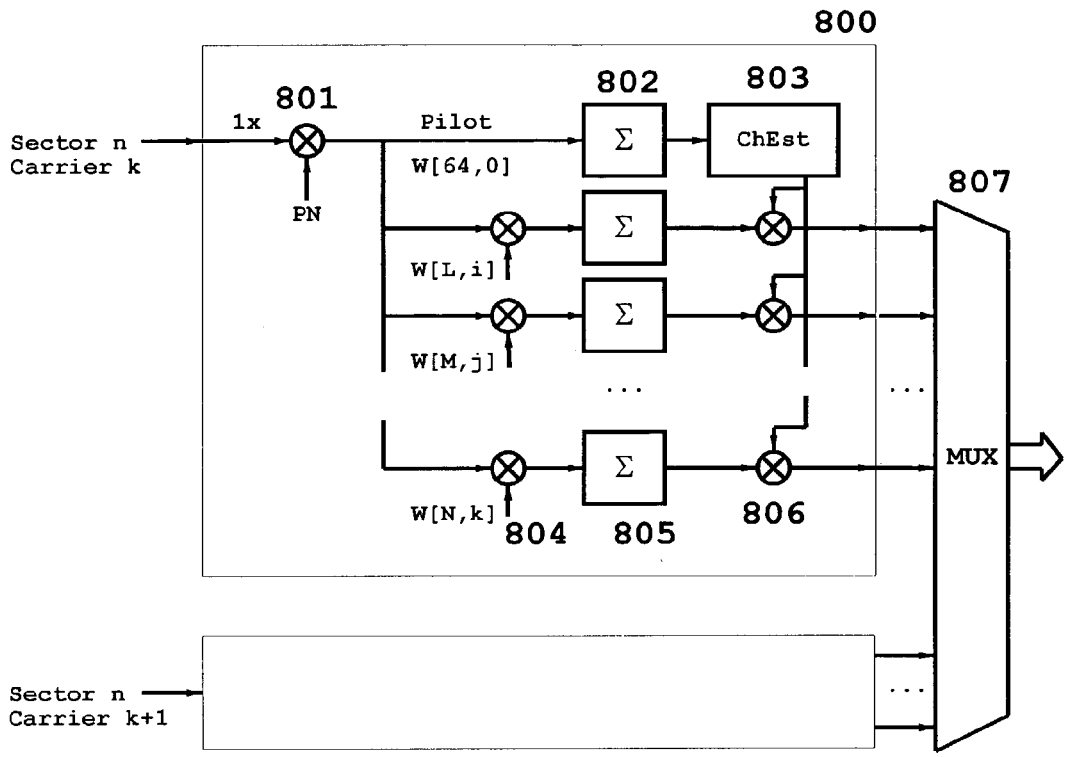
Figure 10 - Forward Link Channel Simulation with Power Control Rate Signal Processing Option
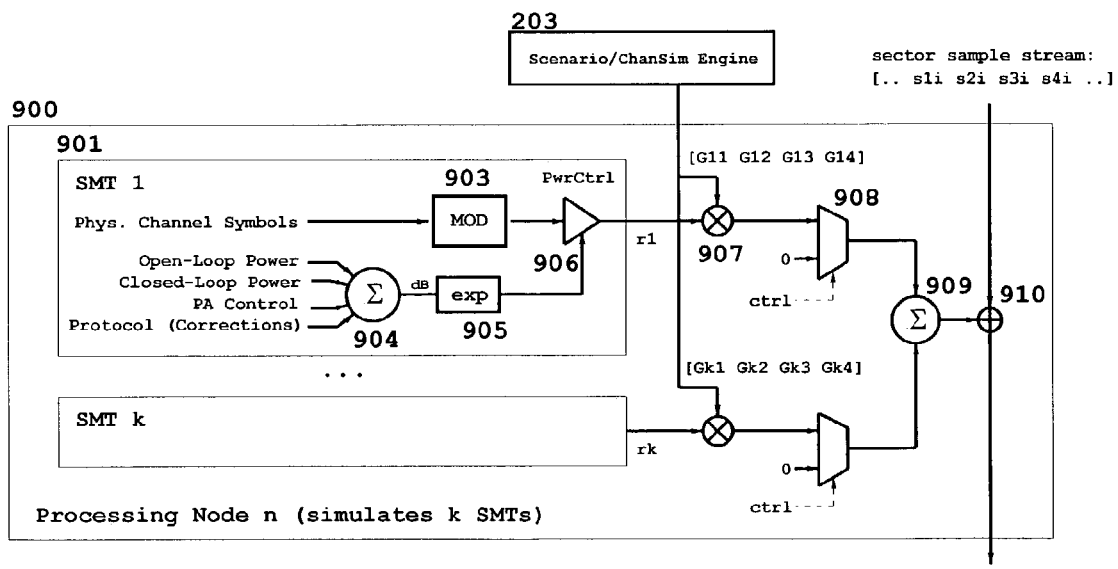
Figure 11 - Reverse Link Channel Simulation and Signal Processing

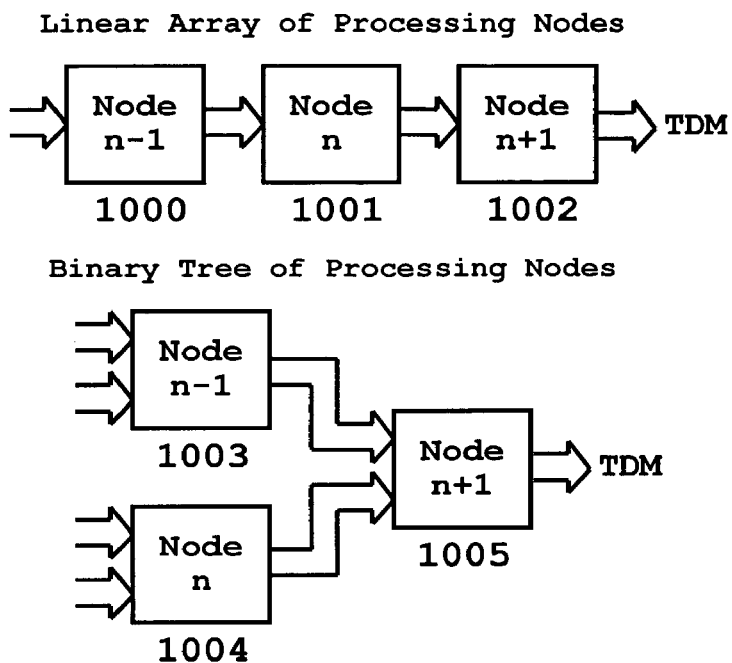
Figure 12 - Reverse Link Channel Combining Topologies
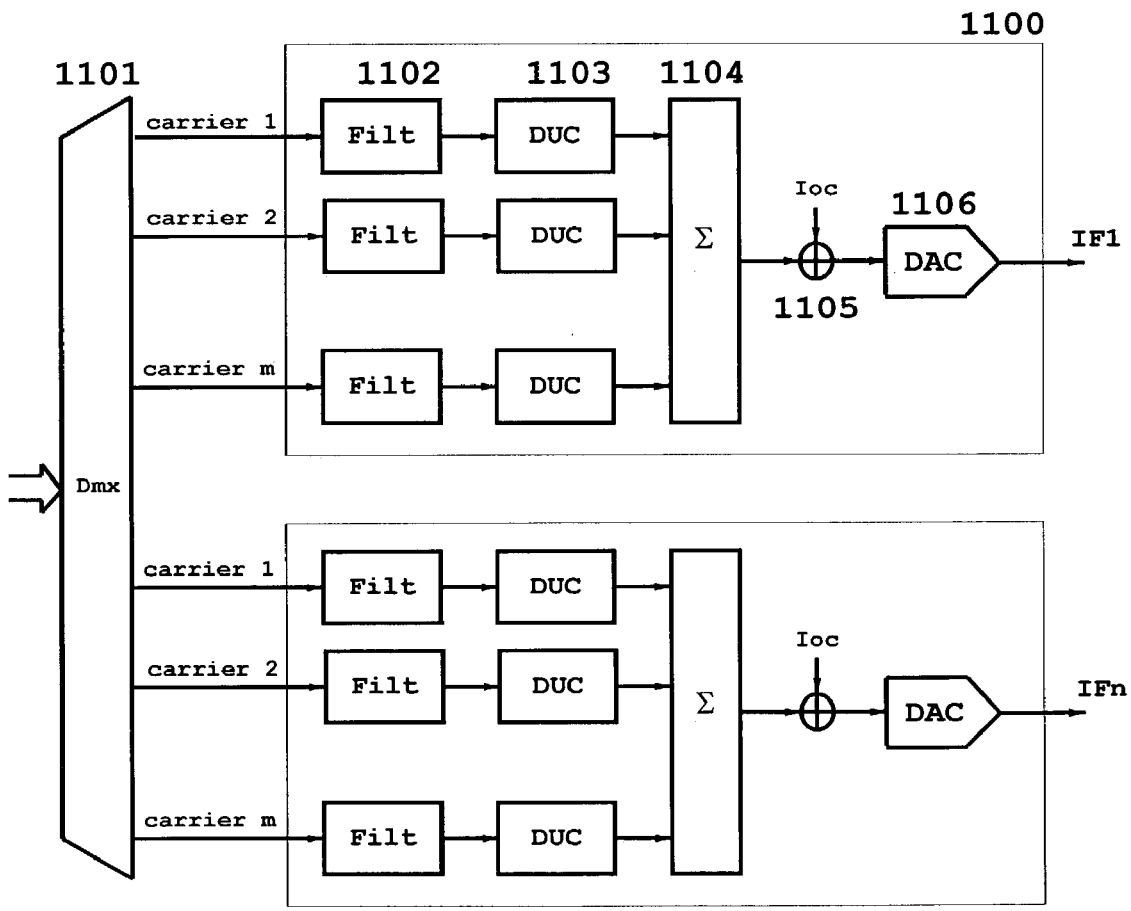
Figure 13 - Reverse Link Upconversion Option 1

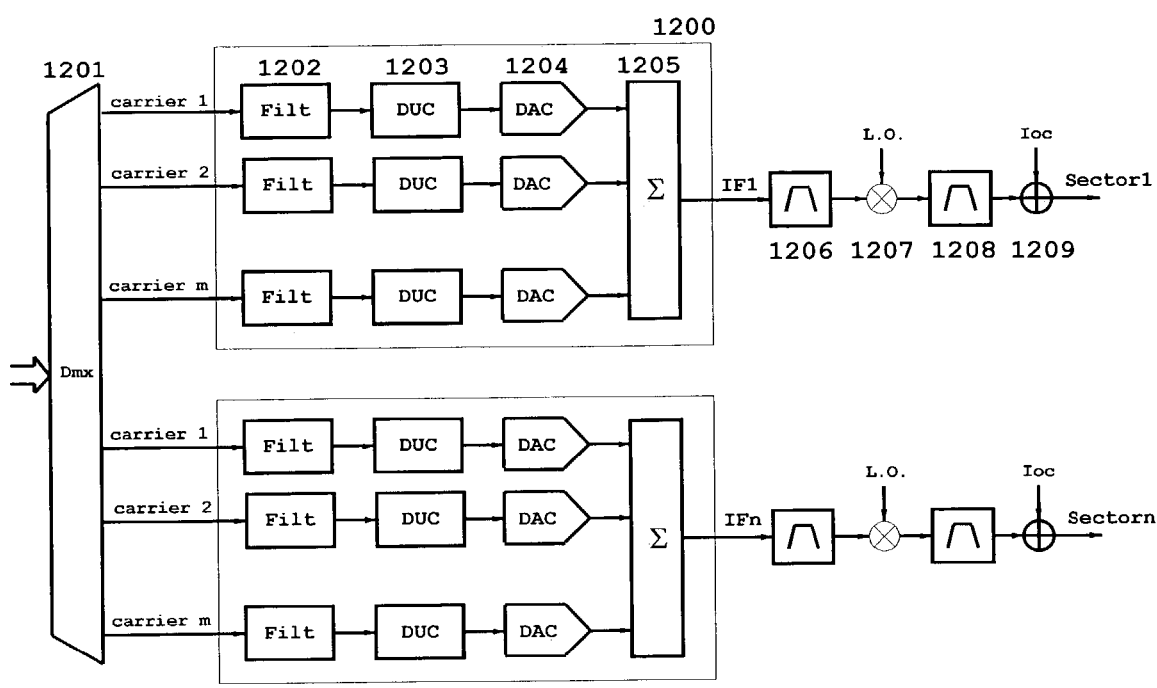
Figure 14 - Reverse Link Upconversion Option 2

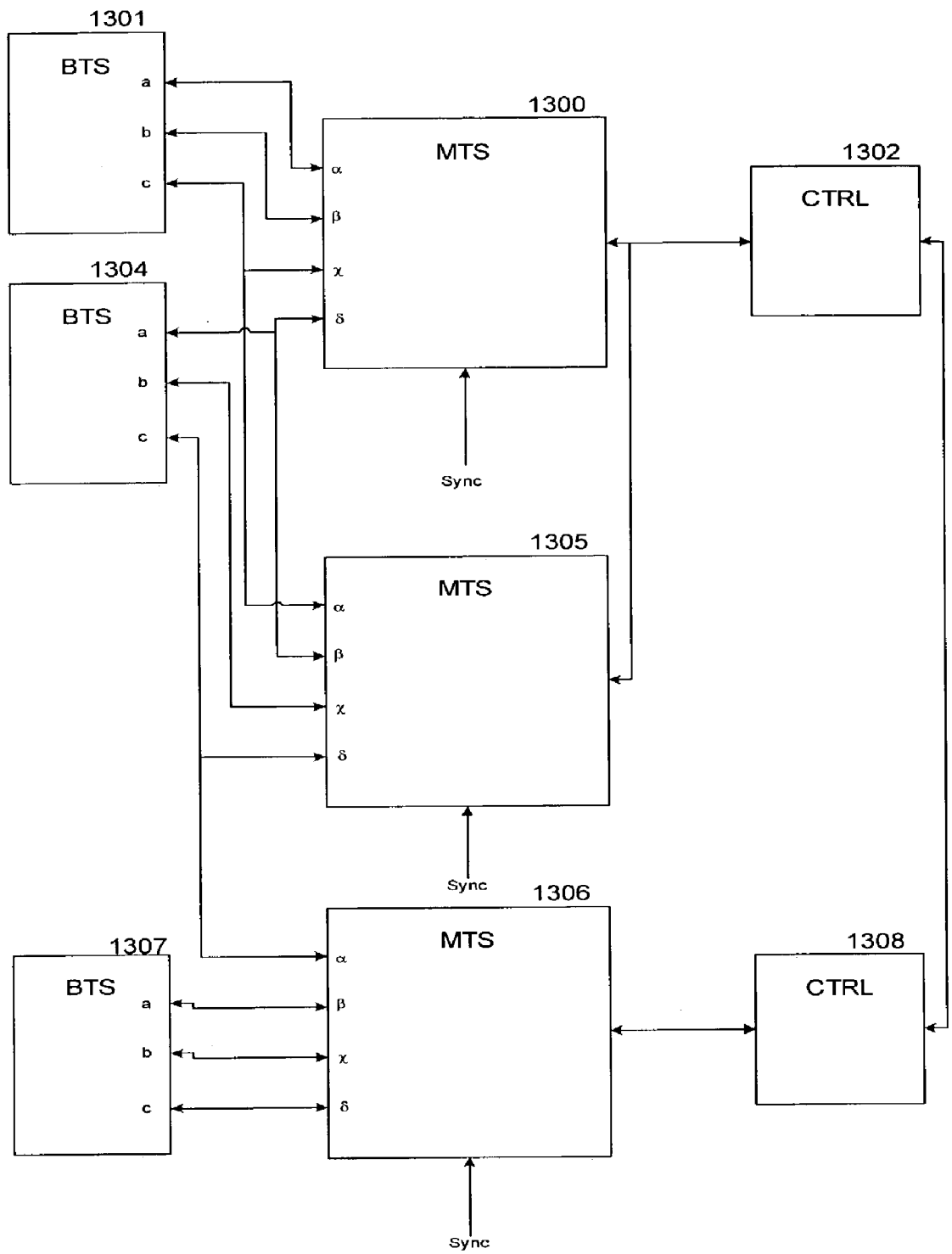
Figure 15 - Complex Deployment Arrangement

WIRELESS SIMULATOR

Priority is claimed from U.S. provisional application No. 60/356,728 filed Feb. 15, 2002. The entire disclosure contained therein, including the attachments thereto, is incorporated herein by this reference.

1 INTRODUCTION

1.1 Field of the Invention

The present invention relates to testing and optimizing a collection of wireless communications network components generally, and specifically introduces a self-contained, Software-Defined Radio (SDR) platform for this purpose.

1.2 Background of the Invention

Wireless communications systems are composed of both network infrastructure components (e.g. basestations) and mobile terminals (MTs, typically handsets). During the product lifecycle of network and mobile terminal components, the developers and manufactures test to verify proper operation, and optimize to improve operation. During network equipment installation, commissioning, and deployment, and for ongoing network maintenance, the network operators test and optimize the installed equipment.

Certain significant tests of wireless network and mobile components require the availability of several controlled reference MTs. These MTs are used to impose a known set of conditions on the wireless network components in order to determine network and mobile performance with respect to an established standard or performance target.

The technology used in wireless communications continues to advance. The general trend is a migration from analog to increasingly sophisticated forms of digital technology to address demands for higher voice quality, higher throughput per user, better coverage, more robust service, and more efficient use of limited spectrum.

The situation presents an ever-changing set of conformance conditions for the developers of wireless network and mobile equipment and wireless network operators.

The continuing evolution of wireless standards causes increased complexity in the testing scenarios for both equipment developers and network operators. Newer-generation standards are developed to be compatible with, or at least complementary to, existing and past generations. Any new wireless network is intended to support a population of subscribers having a mix of MTs conforming to different standards. As such, developing and verifying the operation of new network components requires regression testing against older standards, and testing against a known, mixed population of MTs conforming to different standards.

Wireless standards also evolve to provide higher-bandwidth to subscribers. However, the radio spectrum available for wireless systems continues to be restricted. Since the wireless network is spectrally-limited, it is also capacity limited. The newer standards supporting increased bandwidth, sacrifice subscriber capacity for speed. The speed-versus-capacity tradeoff is made continually and dynamically in a live system as subscribers demand service. To test and verify the capacity-bandwidth envelope of the wireless network, the extremes of system loading must be imposed. To test and verify the capacity-bandwidth capabilities of MTs also requires precise control over system loading. Such tests require a known population of MTs with mixed bandwidth demands.

For a general explanation of the technical context of this invention, and where particular attribution herein is appropriate, the following standard texts and standards are referenced herein,

[1] J. G. Proakis (1995), Digital Communications, 3rd, Ed., McGraw-Hill, New York, 758ff

[2] A. J. Viterbi (1995), CDMA Principles of Spread Spectrum Communication, Addison-Wesley, Reading, Mass.

[3] TIA/EIA/IS-91-A, Base Station—Mobile Station Compatibility Specification for 800 MHz Cellular, Auxiliary, and Residential Services

[4] TIA/EIA-95-B, Mobile Station—Base Station Compatibility Standard for Wideband Spread Spectrum Cellular Systems

[5] TIA/EIA/IS-2000 Series Rev A, CDMA 2000 Series

[6] 3GPP W-CDMA Standard Rel-1999

[7] 3GPP Global System for Mobile Communications 1999

[8] 3GPP General Packet Radio System 1999

To illustrate the wireless standards evolution, consider that the 1G analog cellular standards for North America (AMPS—Advanced Mobile Phone System[3]) have already been augmented by 2G digital standards like IS-95 CDMS [04], and currently service millions of subscribers. The network operators offer service to subscribers using 1G, 2G, and hybrid handsets. The 2G standards allow hybrid handsets to hand-off live calls from 2G to 1G. As a consequence, the standards bodies and infrastructure providers develop products to accommodate the mixed subscribers base. The trend is continuing, with 2.5G and the forthcoming 3G standards like DCMA2000 [05] and W-CDMA [06] providing backwards-compatibility with IS-95 CDMA [04]/AMPS [03] and GSM [07]/GPRS[08]. There is a clear trend towards increased complexity in the testing scenarios required to develop, install, and commission forthcoming equipment and maintain and optimize existing equipment.

Part of this evolution of network equipment is towards support for larger numbers of active connections to reduce the amount of required infrastructure equipment. Testing and optimizing such equipment is challenging because the range of conditions under which it is used, is very large. For example, wireless network BTSs have two scalable factors that determine the upper limit on the number of supported connections: the sectorization and the number of carrier frequencies. A single sector, single carrier IS-95 BTS should support 30 to 40 simultaneous connections. A 3-sector, 9-carrier BTS should support more than 800 simultaneous connections. Fully testing and optimizing a BTS capable of such range requires a methodology that can exercise it over this whole range.

In addition to load management, two techniques that are critical to the performance, quality, and efficiency of wireless networks are: the ability of a MT to move among the coverage areas of different pieces of network equipment while maintaining a connection (i.e. handoff when appropriate) and the ability of the entities involved in a wireless exchange to provide a feedback mechanism that reduces the transmit power to the minimum necessary to maintain the call (i.e. power control).

Power control and handoff are particularly important to direct-sequence spread spectrum (DS-SS) networks (e.g. CDMAOne, CDMS2000, W-CDMA). DS-SS networks directly use MT and network power control to limit interference and use handoff to increase call reliability and to reduce interference.

These two techniques can be used to bias the wireless network in favor of particular performance criteria. For example, allowing a particular MT to transmit at a relatively higher power provides it with a connection subject to relatively fewer bit errors. The tradeoff is that the network can support relatively fewer active connections.

Handoff also can reduce error rates by allowing the mobile to switch between the best available wireless links. In DS-SS systems, handoff variants allow the MT to aggregate signals from multiple sources to further reduce either error rates or transmit power or both. The tradeoff is that allowing extensive handoff support limits network capacity.

Optimizing these two techniques for a wireless voice-only network is a challenge because of the wide variability in load, mobility, environment, and equipment. For a data-only or voiceplus data network, the challenge is further compounded by the variability in traffic type, usage pattern, and priority level. Wireless network and mobile testing using multiple, discrete MTs and/or involving multiple BTSs has traditionally been accomplished using a relatively small number of discrete, dedicated MT units. Automated control of these discrete, dedicated MTs is an obvious strategy. However, the collection, connection and control of a group of discrete MTs are tedious, expensive, and error-prone endeavours. Furthermore, as the capability of network equipment has evolved, this approach does not scale practically to the number of MTs required for maximum load testing. Finally, discrete MTs do not typically provide user or application level control to handoff, power control, or protocol behavior required for in-depth testing and optimization.

To illustrate the inefficient nature of testing with discrete MTs, consider a hypothetical laboratory test arrangement. A number of candidate MTs are acquired, at a significant cost, and fixed to a test platform. The antennas are removed from the MTs and replaced with connectors and coaxial cabling to an RF coupling network. The number of coaxial cables and coupling elements required for the RF network greatly exceeds the number of MTs, (e.g. in multi-sector BTSs) as it must approximate the very large number of permutations of possible forward and reverse channel connections.

Further, the batteries are removed from the MTs and replaced with a wiring harness supplying electrical power. An appropriate DC power supply is required to energize the MTs. Finally, each MT is wired and an independent control cable, typically an RS-232 serial cable, back to a controller. Each serial cable contains at least three, and as many as twenty-five, conductors. Clearly, this approach involves a wiring density that becomes unwieldy with large numbers of MTs.

Another dimension of the inefficient application of the monolithic-mobile solution is illustrated by examining outdoor test activity that a network operator might perform. In this environment, a small collection of MTs is used to measure network performance and stimulate specific network responses. In an active network, this activity provides very little knowledge and almost no control of the overall network state at the time of test. In a new network, this activity represents an extremely limited test of the network performance because the load generated is so far from the expected conditions, the MTs experience such a small subset of typical conditions, and the MTs generate such a small range of expected traffic. Alternatively, a collection of MTs may be populated at various geographic locations within a live network. Human operators likely handle the coordinated invocation of these MTs, to impose a set of conditions on the network. Automated invocation of the MTs would require a distributed control network of capacity equal to the wireless network itself—simply a prohibitive cost. As the number of MTs and operators increases, the logistics of coordination becomes unreasonable, leading to costly errors in the test procedures. Only by limiting tests to a small number of MTs and a restricted set of features, might this approach be practical (even though not representative of a large numbers of MTs with different capabilities).

To address the known defects of current methodologies, this invention presents a standalone platform and methodology for concurrently simulating a plurality of MTs (SMTs) on general-purpose SDR hardware (creating a plurality of virtual or simulated MTs, or SMTs). Each SMT supports a plurality of independent forward and reverse radio channels to a plurality of network equipment. The SMTs may operate on different communications protocol standards, and on different frequencies. There is detailed and independent control of the simulation of forward and reverse radio channel conditions of each SMT, in particular, and the behaviour of each SMT generally, in ways well beyond what a discrete MT can or would provide. These features allow for precise handoff and power control test scenarios. The invention also allows for coordination to allow the SMTs to migrate between simulation platforms for further handoff testing and optimization.

In the simulation context of this invention, some sensitivity must be acknowledge to the term and concept of "simulated channel" (and of cognate and derivative terms and concepts, such as "simulating a channel"). Although in real operation, wireless networks and MTs create "real" RF channels between themselves, and although this invention can be viewed as creating aspects of "real" RF channels and then simulating aspects related to channel conditions (e.g. impairments), this invention in its generality, can be seen not so much as simulating communications channels but rather simulating the "marcoscopic" effects of the channel impairments and doing so by performing certain calculations on the baseband signal.

2 SUMMARY OF THE INVENTION 2.1 Software-Defined Radio Platform

According to the first broad aspect, the invention provides an SDR platform consistent with well-defined industry architecture, for the purpose of implementing a plurality of SMTs, in order to test and optimize wireless network and mobile equipment. The nature of SDR allows for several software loads to be developed and operated on the said hardware platform. The invention provides an appropriately configured SDR hardware platform with the capacity to accommodate current and forthcoming wireless interface standards by applying different software loads. Further, the flexible nature of the SDR platform allows multiple wireless standards to be hosted simultaneously for hybrid operation. Finally, the said platform offers an architecture allowing for scalable hardware and software to handle a range of processing capacity requirements. The appropriate amount of hardware may be populated according to the number of SMTs, bandwidth capacity, and sector capacity of a particular application or test scenario.

The platform hosts multiple virtual mobile terminals or simulated mobile terminals (SMTs). Each SMT is capable of conforming to a plurality of standards and of communicating independently of each other with a variety of the network components. Each SMT supports an external diagnostic and control interface that allows extensive reporting of and control over standard behaviors. Each radio channel between an SMT and a network component supports controlled simulation of channel conditions.

2.2 Mobile Terminal Plurality

According to the second broad aspect, the invention provides alternate methodologies of implementing and controlling a plurality of SMTs by sharing SDR functions and resources among themselves. These methodologies allow the number of SMTs to scale as the SDR platform resources scale. These methodologies allow for a simultaneous actuation of SMTs operating on different interface standards, operating on different frequency bands, communicating with a different collection of network elements. Further, these methodologies allow for the exposure of a single external interface for the creation, control, and destruction of said SMTs.

2.3 Network Equipment Plurality

According to the third broad aspect, the invention provides the ability and methodology for testing a plurality of wireless network access points (typically but not necessarily BTSs) simultaneously. The invention allows the testing and optimization of the interaction of said BTSs in a network, under a simulated time- and spatially varying population of SMTs. By using the invention with specific combinations of BTSs, and in concert with existing common test equipment (e.g. spectrum analyzer), tests may be performed on portions of the wireless network infrastructure. The invention allows interacting with a plurality of BTSs. This invention is not restricted to signals originating from only a single BTS (e.g. in FIG. 8, $s_1$ and $s_2$ could come from one BTS, while $s_3$ and $s_4$ come from another BTS).

Further, the invention may be used simultaneously on BTSs using different compatible standards and frequencies, and potentially on different operators' networks.

In addition, the invention allows the testing and optimization of the interaction of a specific, discrete MT with a plurality of BTSs. By creating specific network conditions using a combination of SMTs in specific states, the performance of the discrete MT can be measured and optimized to meet a variety of real-world conditions.

2.4 Channel Simulation

2.4.1 Instantaneous Channel Impairments

According to the fourth broad aspect, the invention provides alternate methodologies to introduce instantaneous simulated channel impairments in both the forward and reverse directions, by applying specific impairment actions at certain stages of baseband processing. These simulated impairments are defined and applied to each radio channel for each SMT separately or in groups. The said simulated channel impairments are defined by a collection of weights to various impairments effects applied to a given SMT (or group thereof). The given collection of impairment weighs for all SMTs will persist by default, or they may be rapidly altered to simulate real-world dynamic channel conditions.

2.4.2 Channel Simulation Playback Engine

According to the fifth broad aspect, the invention provides a mechanism and methodology for specifying and storing sequences of instantaneous channel impairments in scripts, and replaying them in real time.

2.4.3 Channel Simulation Interface

According to the sixth broad aspect, the invention provides an interface for an external controller to configure and control the said instantaneous channel impairments and sequences thereof., and an associated methodology. The said control interface may be combined with the SMT control interface.

2.5 Handoff

According to the seventh broad aspect, the invention enables each SMT to support a number of handoff variants, including softer, soft, and hard, and can respond to handoff directions from the network without being physically mobile, and teaches an associated methodology.

2.6 Detailed Control

According to the eighth broad aspect, the invention's methodology allows detailed reporting and control of the SMT behavior. A discrete MT will typically provide high-level control (e.g. call a number) and reporting (e.g. call status and type). In-depth network testing and optimization requires the ability to generate a controlled environment at all levels of the applicable protocol, something not possible with a discrete, consumer device. The invention allows an external test controller to override the default behavior of an SMT to force the network into a specific state for testing and optimization. For example, the controller may override an SMT's response to network power control to measure the network's response.

3 BRIEF DESCRIPTION OF THE DRAWINGS

A better understanding of the present invention can be obtained when the following detailed description of the preferred embodiment is considered in conjunction with the following drawings, in which:

FIG. 1 shows a basic deployment arrangement involving a single MTS and controller connected to a small set of base stations BTS.

FIG. 2 shows the functional architecture of a MTS.

FIG. 3 shows a functional block diagram of this invention aligned approximately with SDR functions.

FIG. 4 shows an ideal SDR hardware platform for hosting a number of simulated MTs.

FIG. 5 shows the hardware resources used in the SDR hardware platform for a MTS.

FIG. 6 shows the forward link front-end processing.

FIG. 7 shows an alternate forward link front-end processing.

FIG. 8 shows the forward link channel simulation concept with chip rate signal processing option.

FIG. 9 shows implementation details of the forward link channel simulation with chip rate signal processing option.

FIG. 10 shows the forward link channel simulation with power control rate signal processing option.

FIG. 11 shows the reverse link channel simulation and signal processing.

FIG. 12 shows reverse link channel combining topologies.

FIG. 13 shows reverse link upconversion option 1.

FIG. 14 shows reverse link upconversion option 2.

FIG. 15 shows a complex variation of FIG. 1 arrangement with multiple MTSs and controllers connected to a large set of network equipment in a complex and overlapping manner.

4 DETAILED DESCRIPTION OF THE PREFERRED EMBODIMENT

4.1 Abbreviations and Terminology

The abbreviations listed below are those commonly employed in the art (with the exceptions involving MT) and are used herein for ease of reading only. An MT is conceptually a mobile terminal. It is typically a handheld cell phone in the commercial and consumer settings, and when referenced herein as such for those settings, it is herein referred to with the adjective "discrete" (e.g. "discrete MT") with additional adjectives (like "commercial"or "consumer" when further distinctions of a discrete MT are meant). A discrete MT is in distinction to a "simulated MT" according to the invention, which is herein abbreviated as "SMT". The component of the invention that hosts one or more SMTs is referred to as an "MT Simulator" or herein abbreviated as "MTS". There are varying and appropriate levels at which to view the present invention, each with its associated terminology and attendant small (nuanced instead of substantial) differences in meaning. The concepts and terminology of {"virtual", "virtual MT", "VMT"}, {"emulated", "emulator", "emulated MT", "EMT"} would be appropriate alternatives in many contexts of this invention, to {"simulated", "simulator", "simulated MT", "SMT"} adopted herein. These other sets of concepts and terminologies (or subsets thereof) can be considered almost synonymous herein for the purposes of this invention.

| | |
|---|---|
| AGC | automatic gain control |
| ADC | analog-to-digital conversion |
| AWGN | additive white Gaussian noise |
| BTS | base station transceiver subsystem or simply, "basestation" (which has 3 sectors for illustration herein) but may, depending on the context, refer to a cell, a sector within a cell; a BTS controller or switch or other part of the cellular system that refers to any non-MT functionality. |
| CDMA | code division multiple access |
| CPU | central processing unit |
| CTRL | controller |
| DAC | digital-to-analog conversion |
| DDC | digital down-conversion (from IF to baseband) |
| DUC | digital up-conversion (from baseband to IF) |
| DLL | delay-locked loop, herein used to track the timing of a PN sequence |
| $E_b/N_t$ | ratio of combined received bit energy to the effective noise power spectral density, or "energy per bit per noise power density"and is an important metric indicating link quality |
| $E_c/I_o$ | ratio of average PN chip energy to total power spectral density including signal and all sources of interference (synonymous with "pilot-strength") |
| $E_c/I_{or}$ | ratio of average PN chip energy to total transmit power spectral density for a single transmitter |
| GPS | global positioning system (used as an accurate time and frequency reference in e.g. IS95/IS2000 CDMA networks) |
| $I_o$ | total received power spectral density, including signal and interference |
| $\hat{I}_{or}$ | received power spectral density of the forward CDMA channel excluding background or other cell interference |
| $I_{or}$ | transmitted power spectral density of the forward CDMA channel for a single transmitter |
| $I_{oc}$ | received power spectral density of a (bandlimited) white noise source simulating other cell interference |
| IF | intermediate frequency |
| $N_c$ | number of CDMA carriers |
| $N_s$ | number of BTS sectors that an MTS can communicate with (for illustration herein, Ns = 4) |
| $N_m$ | number of MTs |
| MT | mobile terminal |
| MTS | mobile terminal simulator according to this invention |
| PA | power amplifier |
| PN | pseudo noise sequence |
| RAM | random access memory |
| RF | radio frequency |
| SDR | software-defined radio |
| SYNC | external frequency/timebase synchronization of MTS |
| TDM | time-division multiplex |
| SMT | virtual or simulated MT according to this invention |
| W/R | CDMA processing gain being the ratio of spread bandwidth to original data rate |

MT Class defines attributes of a MT, like maximum transmitter power, slotted operation capability, dual-mode CDMA/AMPS capability.

Chips are PN sequences that are spread. Symbols are the smallest element of a block of traffic data to which forward error correction has been applied.

Traffic channel (as distinct from control and administrative channels) are channels which carry user (e.g. voice) information.

The terms "carrier" and "carrier frequency" are used synonymously herein.

Protocol stack is the set of network protocol layers that work together to provide end-to-end communications between two entities.

SDR are radios that provide software control of a variety of modulation techniques, wide-band or narrow-band operation, communications security functions (such as hopping), and waveform requirements of current and evolving standards over a broad frequency range.

Flat fading is fading in which all frequency components of a received radio signal vary in the same proportion simultaneously. Rayleigh fading is a form of flat-fading caused by multipath reception. The MT antenna receives a large number of reflected and scattered waves. Because of wave cancellation effects, the instantaneous received power seen by a moving antenna becomes a random variable, dependent on the location of the antenna.

4.2 Introduction

The preferred embodiment of the invention provides a scalable SDR platform capable of simulating up to (nominally) one thousand virtual or simulated mobile terminals SMTs with individually simulated channel conditions, operating on a CDMA cellular standard, and directly connected to the cellular network equipment. Further, the preferred embodiment of the invention is capable of being connected to similar devices through standard connection means (e.g. Ethernet), to allow an extension of the capabilities.

Where specifically required for illustrative purposes, the preferred embodiment may be considered to implement the CDMA2000 cellular standard. However, the preferred embodiment is capable, with only certain straightforward modifications, to implement well-known cellular standards such as GSM, GPRS, EDGE, WCDMA-FDD, WCDMA-TDD, TDS-CDMA, or a mixture thereof. Further, the preferred embodiment is capable, with certain straightforward modifications and the addition of an external antenna arrangement, of functioning within a live network.

4.3 System Context

FIG. 1 shows a generic context in which the MTS (100) is used.

MTS (100) is connected to the $T_x/R_x$ sector ports a. b and c. of at least one BTS (101). In addition, it may also be connected to the ports of diversity antennae, if those exist on BTS (101). MTS (100) connects to Controller (102), and optionally is subject to synchronization (103), established by a reference signal supplied by a BTS, a GPS or other external timing reference or established internally by locking onto the BTS's RF signal. The connections between BTS (101) sector ports and MTS (100) may be advantageously effected directly by wire connection or wirelessly (in which case, MTS (100) is equipped with a PA, antenna and ancillary equipment) or by any other means having no or negligible physical impairments). SMTs are hosted in MTS (100) (as explained below).

MTS (100) is controlled by Controller (102), which performs a host of command, control, monitoring and interface functions. For simplicity of explanation, reference will be made below only to Controller (102) except in the more complex context of FIG. 15, where reference may be to Controllers (1302) and (1308) individually, collectively and acting in a coordinated fashion in accordance with a "upstream" management intelligence (e.g. user application for testing according to this invention). However, the basic functions of Controller (102) explained below, apply equally to each of multiple Controllers (1302) and (1308).

Controller (102) acts as a server to external user applications, implements the control and functions related to the SMT, and in particular, controls the MTSs. In this latter category of responsibilities, Controller (102) functions to control and co-ordinate all the activities of the MTSs and other elements (e.g. transceivers) and executes the test scripts, collects parametric and diagnostic data. Controller (102) is also responsible for: controlling the power and reset state of MTS, providing the operational software and FPGA configuration images for the MTS, managing the features of the MTS and software licenses therefor (for example, this invention can be commercialized by licensing MTSs, with royalty rates depending on variables like activated features described here, usage and like resources), controlling the activity of SMTs on the MTS, executing test procedures and test scripts, collecting and co-ordinating parametric data between MTSs, collecting, generating, and storing diagnostic data for the entire system.

Also, Controller (102) mediates the basic operations of SMT management (create, destroy, start, stop, save, restore, get parameters, set parameters and control logging), and SMT call processing (initiate call, answer call, send traffic, receive traffic, send data, receive data).

FIG. 15 shows a more complex context in which multiple MTSs (1300), (1305) and (1306) act in a coordinated fashion under the coordinated control of multiple controllers (1302) and (1308). In such a context, the MTSs need not all be configured identically to support the same protocols. For example, in the complex context of FIG. 15, controllers (1302) and (1308) (in addition to their normal responsibilities) also together coordinate hard handoffs between BTSs that operate on different protocols (perhaps owned by different operators).

MTS (100) is designed to host and support many (nominally 128) SMTs across (nominally four) BTS sectors. If a single BTS has three sectors {a,b,c}, then in the multiple BTS arrangement of FIG. 15, a MTS supports at least one sector from (at least) two BTS each and therefore has more sectors than the smallest number of sectors on a BTS. Herein, for illustration purposes, Ns=4 (i.e. MTS ports $\alpha$, $\beta$, $\chi$, and $\delta$).

4.4 System Architecture

FIG. 2 shows the general functional architecture of the MTS. The MTS is shown as being supported and controlled by Controller (102) and scenario/channel simulation engine (203) ("Control Flow" in dotted arrows in contrast to "Data Flow" in solid arrows). The approximate relationship of MTS (100) of FIG. 1 relative to the functional architecture of FIG. 2, is expressed as the dotted box in FIG. 2 surrounding blocks 200 to 205, and 207 to 209.

From the BTS antenna ports, the forward link signal enters a duplexer (200), is processed in the RF-to-IF downconverter (201) and the digital downconversion block (202). The signal then enters the forward channel simulation matrix (204), which feeds the signal into SMT pool (205). SMT pool (205) is connected to controller (102). The reverse link signal originates in SMT pool (205), enters reverse channel simulation matrix (207), and is subsequently processed in digital upconversion block (208) and IF-to-RF converter (209), from where it is input into duplexer (200) and optionally directly fed to BTS diversity antenna ports. The channel simulation blocks (204), (207) are controlled by the scenario/channel simulation engine (203), which in turn is controlled by controller (102).

In FIGS. 1, 2, and 15, the power distribution lines and the high throughput communications links between controller and the MTSs that are part of the connective or switching fabric, are not shown for simplicity of illustration only. The high throughput communication links may be a 100 Mbps Ethernet switch and are in any case, much faster than those of a typical, discrete, MT (which range typically 38 Kbps to 1 Mbps.).

Scenario/channel simulator engine (203) is not shown in FIGS. 1 and 15 for shown for simplicity of illustration only. The functional role of engine (203) in the control of the simplicity of illustration only. The functional role of engine (203) in the control of the MTS (specifically the forward and reverse channel simulation matrices (204) and (207) is described below in conjunction with Controller (102) and MTS (100) and FIGS. 2, 8, 9 and 11. As such, engine (203) can be considered (and implemented partially) as part of Controller (102) for high level control functions but mainly can be considered (and implemented) as part of MTS (100) because the nature and low level of its tasks are intimately connected to those of MTS (100). The dotted MTS box in FIG. 2 cuts across engine (203) to reflect the straddling role it plays.

The basic unit of scalability is the MTS, as evident from FIGS. 1 and 15. In combination with controller(s), other appropriate minor processing blocks and control, power and synchronization lines, and a fast, connective or switching fabric therefor, the number of MTSs that can be employed is constrained only by limitations in the processing power of the controller block(s) and the speed of the connective or switching fabric thereamong. Furthermore, it is possible to link combinations of MTS (each combination being a multiple arrangement as in FIG. 15).

4.4.1 SDR Functional Architecture

FIG. 3 shows how the general architecture of the MTS aligns with the well-known SDR functional architecture.

FIG. 5 shows a possible hardware implementation of MTS (100). It includes a fast CPU with its RAM memory plus other ROM memories, and processors (like DSPs, FGPAs and ASICs) which are appropriate for their assigned tasks. The CPU executes machine code that emulates a protocol stack for each SMT. The state information of an SMT is all the variables and parameters and any other information necessary for the SMT to operate at a given instant of time in the MTS (and as such, has more information than a channel profile has, as explained elsewhere). The state information of an SMT is stored in a (preferably contiguous) block of data stored in the MTS's RAM. This state information encapsulated the full state of the protocol stack for the SMT. In this way, a MTS cradles or hosts one or more (usually many) SMTs.

Moving the state information of an SMT involves transmitting its data block from the RAM in the source MTS to the RAM in a target MTS (selected by Controller 102) via a high throughput communications link (e.g. 100 Mbps Ethernet) and initializing the machine code for a protocol stack on the CPU of the target MTS using that data block. The moving of an SMT's state information is pertinent when considering handoffs (explained elsewhere).

FIG. 5 is simplified for economy of explanation only. Obvious alternatives including sharing RAM and sharing CPUs with other MTS, to hold the state information of multiple SMTs.

In one implementation, the MTS is designed to host and support nominally 128 SMTs across four BTS sectors. The BTS sectors may be individually configured for any band-classes and carrier frequencies, provided all bands and carriers are supported by the respective transceivers, and all carriers within a band class are limited to a 15-MHz sub-band.

A given SMT can only be "turned" to one carrier frequency at a time, and therefore only participate on traffic channels supported by its host MTS.

Once instantiated (and its script activated, explained elsewhere), the SMT will exist and function correctly at steady-state on a MTS without requiring any intervention from Controller (102). This means that so long as the SMT stays on a given BTS sector, band-class, and carrier frequency (as seen by the MTS), it is capable of maintaining itself. Automated responses or pre-determined operations may also be hosted on the MTS on a per-SMT basis, further reducing the need for chatter with Controller (102). Since soft-handoff is highly processing-intensive, SMTs hosted on a MTS may only engage in soft-handoff across BTS sector-carrier combinations on the host MTS. Therefore, soft-handoff is only possible on MTSs with two or more sector ports configured for the same band-class and carrier frequency. It is possible to configure each MTS sector port differently in which case soft-handoff will not be possible for SMTs hosted on the MTS. Hard-handoff between frequencies, bands, and CDMA systems is possible both within and between MTSs. However, a hard limit is imposed on the number of SMTs hosted simultaneously on a given MTS. There must be a spare position in the destination MTS for an SMT to accomplish a hard-handoff, otherwise the SMT will remain on the source MTS (and react as if the handoff had failed). Since the control bandwidth between a MTS and Controller (102), is fixed, there are constraints placed on the amount of diagnostic logging, and the number of SMTs with externally-hosted user applications, that may be hosted on a given MTS.

4.4.2 SDR Platform

An ideal hardware platform is shown in FIG. 4 that consists of a generic, standards agnostic SDR platform. A transceiver front-end converts the BTS's analog RF to IF (or converts the MTS's IF to RF in the other direction) which is then digitized with ADCs (or converted to analog with DACs in the other direction). The CDMA physical layer chip-rate processing is implemented in FPGAs and the physical layer symbol-rate processing is implemented in DSPs, while the upper protocol stack is implemented in CPUs.

The main goal of the hardware platform is density and scalability. The amount of hardware required for various test scenarios depends only on the number of SMTs being simulated concurrently. There is no redundancy as the system is scaled up.

An implementation of the ideal hardware platform of FIG. 4, is shown in FIG. 5. Each such hardware block hosts up to 128 SMTs. An ADC/DAC pair is present for each CDMA channel directly visible to the SMTs. For commercial purposes, a limit of 4 CDMA channels (4 ADC/DAC pairs) is available per hardware block.

As the hardware described is quite generic in nature, a number of commercial options satisfy the general design. For example, a common ATX-style motherboard is used with a 2.4 GHz Pentium 4 processor from Intel to host the upper layer protocol stacks. PCI carrier cards are connected to the motherboard. The carrier cards hold 2 SMT-365E modules and 2 SMT-370 modules from Sundance Multiprocessor Technology Ltd. of Chesham, UK. The former each include a 600 MHz 64-bit TMS320C6416 from Texas Instruments Inc. of Dallas, Tex., USA and a XC2V6000 Virtex II FPGA from Xilinx, Inc. of San Jose, Calif., USA. The latter each include 2 AD6645 14-bit ADCs and 2 AD9777 16-bit DACs. The Sundance modules are interconnected using the Sundance High-speed Bus and are connected to the host CPU using the PCI bus.

With some modifications to the implementation, the SDR platforms from a number of vendors can be used (for example, the SDR-3000 platform from Spectrum Signal Processing Inc., of Burnaby, BC, Canada).

The Forward Links and Reverse Links described below are viewed from the point of view of the SMT (i.e. the receiving terminal of the forward link and the sending terminal of the reverse link).

4.5 Forward Links

With general reference to FIG. 2, the RF originating from each BTS sector represents the aggregate signal of a number of individual RF carriers. This sector signal is downconverted, via an intermediate (IF) stage, to baseband. The digital downconversion process separates the sector signal into its individual carriers, each represented by a chip-rate complex sample stream.

In the major variant of the preferred embodiment, the carrier signal enter forward link channel matrix (204). Channel simulator engine (203) controls forward channel matrix (204) to model the propagation conditions from each BTS sector to each SMT concurrently. From the output of forward channel matrix (204), signals representing a weighted sum of BTS sectors, are fed into receivers shared by the SMTs. Through a serial/parallel arrangement, a distinct receiver chain exists for each active SMT, such that the combined and scaled carriers directly impact the symbol energy and ultimately the forward link bit-error rate. SMT pool (205) of FIG. 2, are those SMTs instantiated by Controller (102) by the definition of appropriate state information as part of the definition, assignment and activation of a test script (explained elsewhere), from which they are dynamically assigned to any sector/carrier combination, thereby allowing handoffs (explained below).

In an alternative embodiment, the carrier signals are demodulated in parallel to develop several symbol streams. These symbol streams, along with parametric channel data, are fed into the SMT pool (205), where a shared decoder function produces a parallel set of data frames. Any given SMT selects and processes only those symbol streams intended for it. By varying the parameters of the channel simulation, handoff conditions and/or data frame quality may be simulated independently for each SMT.

4.5.1 RF to Digital Baseband Processing

The RF spectra presented to the device for the forward link are converted to a set of baseband signals shared among the SMTs. Whereas a collection of discrete MTs would each contain a separate receiver strip instantaneously tuned to a relatively narrow band, the invention receives a wide band and processes several cellular network radio channels in parallel.

The preferred embodiment offers a scalable array of receivers, each tuned to a different, and potentially overlapping, portion of the cellular band, and each producing an intermediate frequency (IF) signal of corresponding bandwidth. Each IF signal is sampled through an analog-to-digital converter (ADC), then fed into a digital downconverter (DDC). The IF carrier frequency, the ADC sampling rate, and the DDC frequencies are all selected for compatibility with the cellular standard(s) implemented by the system software load. The output of the DDCs is a parallel presentation of a number of digital baseband signals, each an over-sampled complex sample stream representing a single cellular system carrier.

A number of possible alternate embodiments are contemplated by varying the number and bandwidth of the receiver(s), number and sampling rate of the ADC(s), and number and capabilities of the DDC(s). At one extreme the architecture is similar to a collection of discrete MTs, where the number of narrow-band receivers and low-rate ADCs equals the number of cellular system channels. No DDC is required for this architecture. This alternate embodiment is not preferred due to higher equipment counts and cost. At the other extreme, the architecture is a single high-bandwidth receiver, signal high sampling-rate ADC, and a set of DDCs, per cellular band and per sector and carrier.

The left portion of FIG. 6 shows the generation of 8x oversampled complex digital sample streams assuming an embodiment employing DDC (401).

4.5.2 Digital Baseband to Chip Processing

After splitting and downconverting the sector signal into its complex sample streams, each CDMA carrier basedband signal is normalized by means of automatic gain control AGC. Pilot search and short PN code tracking are performed in the front-end, since these operations would be redundantly repeated by each SMT assigned to that sector and carrier. Consequently, the invention distributes 1x chip rate data to the SMTs, reducing bandwidth by a factor of 8 compared to the raw digital baseband data. In addition, instead of measuring pilot strength at each mobile, it can be calculated using the sector scaling gain as is shown below.

In one embodiment of the invention (FIG. 6) the signal is downconverted by DDC (401) and its average power normalized by applying AGC (402). The signal is then decimated to chip rate by decimator (405). The decimation phase is continuously adjusted by closed-loop PN tracking DLL (404), which in turn is initialized with a PN phase as determined by PN searcher (403). The output samples are buffered (406) awaiting transport (407) to forward channel simulation matrix (204) (of FIG. 2).

With the front-end processing accurately synchronized to the associated BTS or GPS, closed-loop PN tracking may not be required. To establish chip timing however, the pilot searcher must be able to determine the short PN phase to within $\frac{1}{8}$ of a chip time. Donwsampling is then accomplished by straightforward, fixed-ratio decimation of the oversampled chip stream, whereby the decimation phase is determined by the PN searcher. This is shown in FIG. 7. Again the signal is downconverted by DDC (501), normalized by AGC (502) and decimated by fixed-rate decimator (503).

System acquisition of the entire set of carriers of a sector is accomplished using a single, reassignable PN searcher (504). This PN searcher is initially assigned to acquire the short PN of the first carrier, whereby known parameters, such as GPS time and sector PN offset, may be used to assist the search process. Subsequent searches on the remaining carriers of the same sector will use knowledge of the actual PN phase of the initial carrier.

The reassignable searcher will then continue to be used both for periodic PN tracking adjustments and periodic measurements of each carrier's pilot $E_c/I_{or}$ as a prerequisite for determining the SMT's pilot strength $E_c/I_0$.

4.5.3 Chip To Symbol Processing

On the forward link, channel simulation is limited to scaling the energy contribution of each BTS sector, and the interference level. In the preferred embodiment, two architectures are considered to implement the channel simulation processing: the Chip Rate Channel Simulation option and the Power Control Rate Channel Simulation option.

Sector Scaling and Combining Concept. The operation of the forward link sector scaling and combining can be described by the following product, where R is the $(N_m, N_c)$ matrix of received signals at all MTs, $G_{fwd}$ is the $(N_m, N_s)$ matrix of channel gains, and S is the $(N_s, N_c)$ matrix of sector signals:

$$R = G_{fwd} S \quad (1)$$

with $$R = \begin{pmatrix} r_{11} & r_{12} & r_{1Nc} \\ r_{21} & r_{22} & r_{2Nc} \\ r_{Nm1} & r_{Nm2} & r_{NmNmc} \end{pmatrix}$$

$$G = \begin{pmatrix} G_{11} & G_{12} & G_{13} & G_{14} \\ G_{21} & G_{22} & G_{23} & G_{24} \\ G_{31} & G_{32} & G_{33} & G_{34} \\ G_{Nm1} & G_{Nm2} & G_{Nm3} & G_{Nm4} \end{pmatrix}$$

-continued $$S = \begin{pmatrix} s_{11} & s_{12} & s_{13} & | & s_{1Nc} \\ s_{21} & s_{22} & s_{23} & | & s_{2Nc} \\ s_{31} & s_{32} & s_{33} & | & s_{3Nc} \\ s_{41} & s_{42} & s_{43} & | & s_{4Nc} \end{pmatrix}$$

The channel gains are generally time varying, i.e. $G_{fwd}=G_{fwd}(t)$, simulating the contributions received from the involved BTS sectors, and real-valued. This is mathematically equivalent to applying attenuators in the RF domain. Note that only those $r_{ik}$ have to actually be calculated where k is the carrier to which mobile i is instantaneously assigned.

Calculation of sector gains. Individual pilot strengths, as experienced by a SMT, are derived from both measured parameters and the channel simulation parameters. Specifically, the sector gains $G_{ij}$ are adjusted to achieve a target pilot channel $E_c/I_0$ at the "input" of each SMT.

First we consider pilot strength $(E_c/I_0)_k$, expressed as a function of transmitted pilot $(E_c/I_{or})_k$ and the ratio of total received power vs. power contribution due to sector k, $$\left(\frac{E_c}{I_0}\right)_k = \frac{\left(\frac{E_c}{I_{or}}\right)_k}{\frac{I_{oc} + \sum \hat{I}_{or,i}}{\hat{I}_{or,k}}} \quad (2)$$

Now we express received power using the sector gains $G_i < 1$, $\hat{I}_{or,i} = G_i^2 I_{or,i}$ and $$I_{oc} = G_{oc}^2 \sigma^2.$$

Note that for each sector i, $I_{or,i}$ is normalized due to AGC action. For simplicity we will assume that $I_{or,i}=1$ here (although in reality, this will be some setpoint between 0 and 1). Also, let $\sigma^2=1$ be the variance of a normalized AWGN source. Then $$\left(\frac{E_c}{I_0}\right)_k = \frac{\left(\frac{E_c}{I_{or}}\right)_k}{\frac{G_{oc}^2 + \sum G_i^2}{G_k^2}} \quad (3)$$

Under the normalization condition $$G_{oc}^2 + \sum G_i^2 = 1 \quad (4)$$

the $$\left(\frac{E_c}{I_0}\right)_k$$

for sector k, received by the mobile, is then $$\left(\frac{E_c}{I_0}\right)_k = G_k^2\left(\frac{E_c}{I_{or}}\right)_k \quad (5)$$

This is interpreted as follows: the sector gains may be chosen arbitrarily, subject to (4), while $G_{oc}$ is adjusted to meet the normalization condition.

This approach to sector scaling and combining opens up the possibility of calculating, instead of measuring (using search hardware) the pilot strength experienced by each mobile. This can be seen by observing that pilot strength $$\left(\frac{E_c}{I_{or}}\right)_k$$

is measured by the front-end PN searcher. By using (5), the simulated pilot strength can be easily calculated. Note how this situation is distinct from a discrete MT which is always subject to other cell interference. By being directly connected to the sector ports of the BTS, the MTS is not subject to $I_{oc}$, so a desired $E_c/I_o$ can be simulated.

Chip Rate Channel Simulation Option. A major variant of the preferred embodiment has the digital baseband sample streams individually scaled, summed, and combined with weighted AWGN to produce a single chip-rate complex sample stream representative of the actual forward-link signal modified by the simulated channel condition. The variant requires $N_s N_c$ baseband streams to be distributed and shared across the scaling/combining blocks through a bus or cross-bar switch. The scaling factors are assigned separately for each SMT or group thereof. A separate, simplified rake receiver is dedicated to each SMT, or a pool of shared rake receivers are time-multiplexed to achieve the same effect.

Where forward link power control is employed, the ratio $E_b/N_t$ is estimated for each traffic channel just as an independent, discrete MT would. In this variant of the preferred embodiment, $E_b/N$ is estimated individually by each SMT.

The concept of the chip-rate channel simulation option is shown in FIG. 8. The chip-rate sector data is multiplied with the sector gains (601), combined (602), other-cell interference is added (603) after which the signal is fed into SMT (604). The sector gains and the interference are supplied by scenario/channel simulation engine (203). A possible implementation of this concept is shown in FIG. 9. The sector data is demultiplexed (703) according to the assigned carrier, then scaled and accumulated in a multiply-accumulate unit (704, 705), other-cell interference is added (706) and the resulting signal is fed into the SMT at its dedicate rake (707).

Power Control Rate Channel Simulation Option. A second variant of the preferred embodiment is provided where scaling and combining of digital baseband sample streams are not necessary to simulate satisfactorily the relevant effects of the channel condition. As a "cruder" version of the Chip Rate Channel Simulation Option above, in this variant, for each SMT, only a single baseband stream, typically the stream with highest signal-to-noise ratio, is used to supply channel symbols. In the front-end processor, each chip stream is de-spread by a single PN despreader, and a parallel bank of Walsh correlators. Each Walsh correlator produces a symbol stream that may be distributed to any number of SMTs for further processing.

Information about pilot strength $E_c/I_o$ as "seen" by the (S)MT is calculated in the manner described above.

In addition, for symbol streams representing traffic channels where forward link power control is employed),—$E_b/N_t$ may be calculated based on observables in the front-end processor, namely traffic channel $E_c/I_{or}$, and the channel simulation parameters, i.e. the sector and AWGN gains.

$$\frac{E_b}{N_t} = \frac{W}{R} \sum_{i \in S} \left(\frac{E_C}{I_{or}}\right)_i \frac{\hat{I}_{or,i}}{I_{oc} + \sum_{j \neq i} \hat{I}_{or,j}} \quad (6)$$

where S is the set of sectors this traffic channel is in soft handoff with, and $$\frac{W}{R}$$

is the traffic channel processing gain. With above substitutions and the normalization condition (4), this becomes $$\frac{E_b}{N_t} = \frac{W}{R} \sum_{i \in S} \left(\frac{E_C}{I_{or}}\right)_i \frac{G_i^2}{1 - G_i^2} \quad (7)$$

The Power ControlRate Channel Simulation option is shown in FIG. 10. Chip-rate baseband data enters this block (800), is despread using the short PN sequence (801), after which it is distributed to Walsh correlators (804, 805). Pilot channel correlator (802) feeds into channel estimator (803) and the conjugated channel estimate is multiplied with the channel symbols output by every Walsh correlator (806). The channel symbols are then transported (807) to the SMTs (in pool (205) of FIG. 2).

Forward-link errors are manifested by purposely corrupting decoded channel data based on an expected error rate for the simulated channel condition.

The above two options are only examples of the "granularity" desired, a function of where the processing steps are "tapped". Other examples of different granularities are groups of symbols and frames

4.5.4 Symbol Streams To Frames Processing

Whereas a collection of discrete MTs would implement independent decoders, the preferred embodiment employs a smaller number of high-speed decoders and applies the decoding process in a time-shared fashion to a plurality of symbol streams. The number of decoders populated is proportional to the number of SMTs, the bandwidth and types of traffic allowed on the applicable cellular standard, and the processing capacity of the SDR hardware platform.

The decoders' inputs are connected to the symbol streams through a bus or cross-bar switching matrix. The output of the decoders are error-corrected data frames. Each data frame has a frame quality indication attached.

The decoder resources include Viterbi and Turbo decoders capable of operating according to the specifications of the applicable cellular standard. In certain cases, rate estimation is performed, and only data frames of the most likely rate are passed on to further processing.

The data frames are distributed across a bus or cross-bar switch, to MTSs where the SMT call processing software is located. Data frames decoded on shared channels (for example the SYNC or PAGING channels) are used by all SMTs. Dedicated data frames are selected by individual SMTs.

In the case where decoded channels also contain power-control information, such information is extracted separately within the decoder and distributed concurrently with the data frames.

4.6 Reverse Links

Each SMT transmitter generates a baseband signal, which is fed into reverse channel simulation matrix (207) of FIG. 2. Here, the signals from each SMT are scaled, combined and subjected to fading conditions. Reverse channel simulation matrix (207) is controlled by scenario/channel simulator engine (203) to model the instantaneous propagation channel envelopes for the propagation paths from SMTs to each BTS sector antenna (and optionally, to each diversity antenna). Reverse channel simulation matrix (207) generates multiple, independently scaled baseband signals from each SMT baseband signal, one for each connected BTS sector. Subsequently, the baseband signals are digitally upconverted to an IF, to form aggregate sector signals, consisting of a number of individual carriers. Finally, the sector signals are upconverted to RF (blocks 208 and 209 in FIG. 2), other cell interference is added, and the signal is presented to the BTS(s) main (and optionally diversity) receive antenna ports.

Although in the forward link, only channel simulation is effect (i.e. power is not simulated because power is "actual" and coming from the BTS), in the reverse link, both channel simulation and power simulation are effected.

4.6.1 Frames To Symbols Processing (per SMT)

The preferred embodiment calls for channel data to be channel encoded for each SMT independently.

4.6.2 Symbols to Chip Processing

FIG. 11 depicts the functional blocks required for reverse link chip-rate processing. Each SMT transmitter section comprises modulator (903), implementing a modulation scheme of the applicable the cellular standard. Modulator (903) accepts symbols from the channel encoder and outputs an oversampled baseband representation of the SMTs transmit signal. While a discrete MT typically controls its output power using an RF PA, in the preferred embodiment power control is accomplished by scaling the digital output of the SMT's modulator (903) according to a simulated power control signal, represented as a sum of logarithmic terms (i.e. in dB) such as open-loop and closed-loop power control terms and parameters (nominal values and correction terms) (904 of FIG. 11) provided by the upper layer protocol. While the logarithmic output power of a PA (in dBm) typically follows the PA control signal in a more or less linear fashion, the digital power control signal must undergo exponentiation for the baseband signal power to scale properly.

4.6.3 Channel Simulation, Sector Scaling and Combining

The operation of the reverse sector scaling and combining can be described by the following product, where S is the $(N_s, N_c)$ matrix of sector/carrier samples, $G_{rvs} = G_{rvs}(t)$ is the ($N_s$,$N_m$) time-varying matrix of real or complex channel gains, and R is the ($N_m$, $N_c$) matrix of the power-controlled mobile transmit signals:

$$S = G_{rvs}R \text{ with} \tag{8}$$

$$S = \begin{pmatrix} s_{11} & s_{12} & s_{13} & \vdots & s_{1N_c} \\ s_{21} & s_{22} & s_{23} & \vdots & s_{2N_c} \\ s_{31} & s_{32} & s_{33} & \vdots & s_{3N_c} \\ s_{41} & s_{42} & s_{43} & \vdots & s_{4N_c} \end{pmatrix}$$

$$G = \begin{pmatrix} G_{11} & G_{12} & \vdots & G_{Nm1} \\ G_{12} & G_{22} & \vdots & G_{Nm2} \\ G_{13} & G_{23} & \vdots & G_{Nm3} \\ G_{14} & G_{24} & \vdots & G_{Nm4} \end{pmatrix}$$

$$R = \begin{pmatrix} r_1 & 0 & \vdots & 0 \\ r_2 & 0 & \vdots & 0 \\ 0 & 0 & \vdots & r_3 \\ 0 & 0 & \vdots & r_4 \\ \dots & \dots & \dots & \dots \\ 0 & r_{Nm} & \vdots & 0 \end{pmatrix}$$

Note in matrix R the SMTs are grouped into mutually disjoint columns, reflecting the assignment of MTs to carriers. Simply using the transposed forward gain matrix $G_{fwd}$ would imply symmetric attenuation on the forward and reverse links, which under most scenarios is not realistic. The SMTs' output samples are weighted with the channel gains, representing the time-varying propagation paths from each SMT to each of the BTS sectors. The preferred embodiment further allows the simulation of the uncorrleated propagation paths to a set of diversity antennae, either by partitioning the total number of supported sectors into sets of n diversity paths per sector, or by actually duplicating the scaling and combining hardware.

Channel Simulation. In the most basic configuration, the gains $G_{ij}(t)$ represent real-valued path loss. This is mathematically equivalent to applying attenuators in the RF domain, as known in prior art. Real-time variation of a large number of RF attenuators is a challenge, where controlling virtually any number of digital gains is not. By allowing the $G_{ij}(t)$ to be complex-valued, more realistic fading envelopes may be simulated, in particular flat fading (e.g. Rayleigh, Rice, Nakagami distributed). Flat fading can be expressed by a multiplicative distortion of the channel with the complex phasor $G(t)=a(t)e^{j\Phi(t)}$, which is varying slow enough to be regarded constant over a symbol interval[1]. The generation of the fading envelopes can occur entirely off-line, while real-time playback is accomplished through scenario/channel simulation engine (203). For the simulation of frequency-selective fading (i.e. multipath) each complex channel gain $G_{ij}(t)$ is now replaced by a tapped delay line channel model.

Combined Power-Control and Channel Simulation. Matrix R may be alternately represented by $$R = KR_0$$

where K represents the instantaneous output power of the SMTs and $R_0$ is the normalized output signals. Since S=GR, we may find a matrix G'=KG, such that S=G'$R_0$. G' is the combined power-control and channel simulation weight matrix. In the preferred embodiment, scenario/channel simulation engine (203) and power-control implementation is optimally combined such that a single gain matrix, G', is developed with an update rate suitable for both power-control and channel simulation.

The parameters used to calculate G' are G (ie. the path losses), closed-loop power-control, open-loop power-control, and constants from the protocol stack, as shown in FIG. 11. In all cases, the raw data used to develop, and hence G', are provided by the forward-link processing (e.g. power-control bits, input power level), and general system parameters are provided by the protocol stack.

Sector Combining. As can be seen from (8), instead of inner products of length $N_s$ on the forward link, those of (much larger) length $N_m$ have to be calculated now, although most terms will be zero, namely of those MTs not assigned to a given carrier. Instead of actually performing redundant computations, control logic may be used to skip those.

In the preferred embodiment, reverse sector combining is accomplished by distributed accumulation, i.e. by adding transmit samples from each mobile to a sample stream. A control logic in the processing node "inserts" the scaled output samples of each MT into the sample stream at the right time, determined by the carrier the mobile is transmitting on, and the sector. A state machine in the processing node generates the necessary control signals. The sample transport medium can be based on time slots, such as TDM, or cross-bar switching.

The processing node logic is shown in FIG. 11 for the case of a serial, time-multiplexed sample stream. A processing node (900) may contain one or more SMTs (901). Channel simulation data is supplied by the scenario/channel simulation engine (203). Each SMT contains a modulator (903) connected to a gain stage (906). The gain itself is the sum (904) of power-control terms, processed by exponentiation block (905). The data is then multiplied with the complex channel gain (907), while multiplexor (908) controls the insertion of the data into the sample stream (910), after adding contributions from other SMTs (909).

Alternative distributed accumulation topologies are possible (e.g. linear array of processing nodes vs. tree structure, see) FIG. 12, depending on the selected inter-node communication technology and the complexity of the processing nodes. Processing nodes (1000-1002) are connected as a linear array, while (1003-1005) are arranged as a tree.

4.6.4 Processing Chips to digital baseband to RF

After scaling and combining, there is a separate baseband signal for each sector and carrier. This would, in most practical scenarios, be a sum of <30 SMTs plus interference. Note that transmit pulse shaping, conventionally being a part of each MT modulator and computationally intensive, can be performed on the combined sector/carrier data, eliminating redundant filtering operations within each SMT, as long as the channel model $G_{rvs}(t)$ can be considered linear and time-variant, or slowly time varying relative to the transmit filter response, as is the case under flat fading.

These baseband signals are digitally upconverted, and all carriers belonging to the same sector are combined. Finally, the sector-IF digital aggregate signal is converted to analog through a DAC arrangement and a final frequency translation to the operational band. Other-cell interference is added to each sector. This can be accomplished in the digital domain, or by adding AWGN from a calibrated wideband noise source to the RF signal. Alternative implementations are shown in FIGS. 13 and 14.

In FIG. 13, incoming reverse link samples are demultiplexed according to sector and carrier (1101), optionally baseband filtered (1102) and upconverted (1103) to IF. With this option, to the sum (1104) of IF samples other-cell interference is added (1105) before digital-to-analog conversion (1106). The resulting analog aggregate IF signal is processed identically to FIG. 14.

In FIG. 14, incoming reverse link samples are demultiplexed according to sector and carrier (1201), optionally baseband filtered (1202) and upconverted (1203) to IF. Each individual IF signal is now digital-to-analog converted (1204). The individual IF signals are then combined (1205). The analog aggregate IF signal is optionally IF filtered (1206) to remove sampling images, then upconverted to RF in the mixer (1207) and optionally filtered in (1208). To the RF signal, other-cell interference is added (1209) from a white noise source.

4.7 COORDINATION AND CONTROL

4.7.1 Handoff

Handoff is the action of passing responsibility for the radio link from one piece of a network to another. It usually results from the MT changing location, moving from one BTS's radio coverage area towards another BTS's radio coverage area. Handoff may also occur because of changing ambient conditions that prompts the system to improve a link metric by transferring responsibility for the MT to a "better" BTS (e.g. extreme traffic congestion in the initial BTS cell).

Hard Handoff. All wireless technologies that support handoff, support at least the variant called "hard handoff". The MT is directed to tune its radio to a different BTS, after which it breaks its connection to the original BTS and attempts to detect, and then communicate with the new BTS. The network is responsible for coordinating both BTSs and insuring that the new BTS picks up the communication at exactly the point expected by the MT.

Soft Handoff. Soft handoff is a variant of handoff that is only available in spread-spectrum technologies because it requires that the different BTSs transmit at the same frequency. The MT communicates with multiple BTSs simultaneously. The MT is responsible for combining the multiple received signals. Network equipment "behind" the BTS (usually a BTS Controller (1302) or (1308) or both operating in concert, as shown in FIG. 15), is responsible for coordinating the BTSs and combining the signal received from each BTS. The advantage of soft handoff is that the combining of the signals allows each signal to be transmitted at lower power than it otherwise would be transmitted. In a spread-spectrum system that translates to lower interference levels and hence higher system capacity.

Softer Handoff. Softer handoff is like soft handoff except that it involves multiple sectors of a single BTS rather than multiple BTSs. In a handoff situation that involves more than two network elements, the handoff may be a combination of soft and softer, involving multiple sectors of a single BTS and sectors of other BTSs.

Handoff of all types challenge wireless system design and optimization. It requires precise coordination of multiple pieces of network equipment, especially in the soft and softer variants. Soft and softer handoff offer the possibility of increased capacity through reduced interference levels. The tradeoff, though, is that each link in a soft handoff also consumes logical code space, so reduces network capacity.

FIG. 15 demonstrates a configuration of the invention capable of exercising all handoff variants.

In FIG. 15, MTS (1300) is being decoded by BTS (1301) sectors a, b and c and by BTS (1304) sector a; MTS (1305) is being decoded by sectors of BTSs (1301) and (1304); and MTS (1306) is being decoded by BTS (1307) sectors a, b and c and by BTS (1304) sector c.

In a hard handoff scenario, a SMT is directed by the network (i.e. a BTS or other higher level management therefore, perhaps according to a test script) to switch either to a carrier from a BTS sector that is already being decoded by the MTS hosting that SMT, or to a carrier that is not.

In the former case, the SMT would start processing frames from the code channel on the new carrier as described in 4.5.4. For example, in FIG. 15, a SMT executing on MTS (1300) might be communicating with BTS (1301) sector a. It may be directed to perform a hard handoff to another carrier frequency on BTS (1304) sector a (or BTS (1301) sectors b or c) which is being decoded by MTS (1300). In this case, the SMT would perform the hard handoff by starting to process the forward channel frames for the new traffic channel.

In the latter case, a hard handoff to a carrier not being decoded by the MTS is also possible, but requires that a controller coordinate the handoff. In FIG. 15, a hard handoff for a SMT on MTS (1300) from BTS (1301) sector a to BTS (1304) sector b would require that Controller (1302) move the state information of the SMT from MTS (1300) to MTS (1305) intact. The SMT would then resume execution in MTS (1305) and complete the hard handoff by processing the forward channel frames for the new traffic channel. In an extension of this concept, if Controller (1302) cannot locate a directly connected MTS that can support the handoff to BTS (1307) in FIG. 15, for example, it then queries other controllers. If another controller is connected to an MTS that can support the new channel (e.g. Controller (1308) in FIG. 15), the state information of the SMT is moved intact to new MTS (1306) via controllers (1302) and (1308).

Soft and softer handoffs are achieved through the sector scaling and combining described in 4.5 and 4.6. A SMT executing on a single MTS (e.g. 1300) can process the decoded forward channel from a carrier frequency on any directly connected BTS (e.g. (1301) sector a,b,c or BTS (1304) sector a). Assuming that the MTS is decoding the same carrier frequency from at least two of the connected sectors, the forward channel scaling described in 4.5 allows each of these forward channels to appear to the SMT in a manner appropriate for the desired handoff condition. Similarly, the reverse channel scaling described in 4.6 allows each BTS sector to receive a reverse channel signal that is appropriate for the desired handoff condition. Through dynamic control of the forward and reverse channel simulations and an implementation of standard pilot set management (i.e. active set, candidate set, neighbour set, remainder set) within each SMT, all of the behaviors of a discrete MT in soft and softer handoff with any of the directly connected BTS sectors can be simulated.

A more complex scenario involves a transition into a soft or softer handoff with a non-directly connected BTS sector. For example, in FIG. 15, a SMT on MTS (1300) may be communicating with BTS (1301) sector c to which it is directly connected. The testing scenario may then attempt to create conditions appropriate for a softer handoff for the SMT between BTS (1301) sector c and BTS (1304) sector b, the latter of which is not directly connected. Controller (1302) then is responsible for finding an MTS that has the requisite direct connections to support the soft or softer handoff condition desired, in this case MTS (1305). Controller (1302) is then responsible for moving the state information of the SMT intact from MTS (1300) to MTS (1305). The SMT will then resume execution on MTS (1305) with the desired direct connections for the soft or softer handoff variant. In an extension similar to the one for hard handoff, multiple controllers may be involved in moving the state information of the SMT to an appropriately connected MTS.

In a variant of the above, the state information of the SMT is not moved to a new MTS but instead, reverse channel data is transmitted between MTSs. The reverse channel processing chains on the different MTSs generate the required RF signals to simulate the soft handoff condition. Forward channel data need not be transmitted between MTSs. As described in 4.5.3, the Power Control Rate Channel Simulation Option in forward link processing, decodes only one of the available forward channels. The forward channel received by the second MTS would not be needed by the SMT, as it carriers identical content to the forward channel being received by the MTS hosting the SMT.

4.7.2 Detailed Reporting and Control

FIG. 1 shows the high level components of the system. At least one SMT is hosted on MTS (100). In addition to coordinating the state information of the SMT as described in 4.4.1 and 4.7.1, Controller (102) maintains a high throughput communications link with MTS (100). As explained earlier, the throughput capabilities of this link far exceed those of a typical, discrete MT (which is more typically 38 Kbps to 1 Mbps). These capabilities allow more detailed reporting on and control over the behaviour of the network and the SMT than what can be achieved realistically with a discrete MT.

In the preferred embodiment, each SMT can be independently configured to report back various levels and types of activity including received and transmitted special, fast power-control commands (described elsewhere), channel frames, channel data, and signaling messages and message attempts.

Sometimes the environment conditions required to force a specific action in the connected infrastructure, are complex and make performing a specific test case too burdensome. This might include reconfiguration of the network or elaborate specification of the channel simulation, all in order to get the MTs (or SMT herein) to generate a desired behaviour to which the network infrastructure (e.g. BTS) must respond for examination.

In the preferred embodiment, the high throughput communications link between Controller (102) and MTS (100) allows external control over many aspects of the behaviour of each SMT. For example, the "default" response of the SMT to the power control commands transmitted from the infrastructure (i.e. a BTS) can be "overwritten" with "special" power control commands (e.g. in FIG. 11, power control (906) is effected by such commands being inserted and processed at (904) and (905)). This forces the SMT to transmit at the desired power level to allow examination of the network's response. In the other direction, the power control commands transmitted by a SMT to the network can be done by sending a special message (as part of a test script) to a predefined communication socket on MTS (100) (not shown for simplicity of illustration), having the SMT identifier, the desired power control commands to transmit, and the time when they are to take effect.

In a typical wireless network, certain configuration values (e.g..initial transmit power) are transmitted to each MT for its use. These values can be "overridden" in the SMT to allow simulation of a "misbehaving" MT to see how the remainder of the network reacts, and examination of the effect on MT behaviour without reconfiguring the entire network. In the preferred embodiment this is again done by sending a specified message with the desired configuration values to MTS (100) over the high throughput communications link.

4.7.3 Mobility Simulation

In a small system like the one shown in FIG. 1, all SMTs have direct connections to all forward link channels and all BTS sectors can receive reverse link signals from any SMT. In such an arrangement, mobility simulation is achieved entirely by the channel simulation method described in sections 4.5.3 and 4.6.3. Controller (102) supplies to MTS (100), the $G_{fwd}$ and $G_{rvs}$ gain parameters for each SMT. MTS (100) applies the corresponding forward and reverse link gains directly to the channel signals. By supplying G gain parameters derived from an appropriate mobility model, the SMTs can generate signals that reproduce the desired mobility. The accuracy of the mobility simulation depends on the sophistication of the mobility model used to derive the G gain parameters, and a number of simple models already exist. A basic model might directly correlate gain with virtual distance from a given BTS. A more complex model might overlay a fast fading profile on top of the basic model.

In a more complex and realistic environment involving multiple BTSs in communication and potential communication with multiple MTS (like the one shown in FIG. 15), a BTS can receive a reverse link channel signal only from a SMT that is hosted on an MTS to which the BTS is directly connected to. For example, BTS 1301 can receive reverse link signals from SMTs hosting on MTSs 1300 and 1305 in the arrangement of FIG. 15. Similarly, an SMT can decode forward channels from all the BTSs that are directly connected to the MTS in which it is being hosted and is executing.

Controllers 1302 and 1308 are equipped to provide limited communications among MTS 1300, 1305 and 1306 sufficient to allow an SMT on one MTS to detect the presence of BTS signals on other MTSs. This allows an SMT on one MTS to report a pilot strength for a signal received by another MTS, although the SMT cannot decode that signal.

To accommodate the preceding complex situations, mobility simulation is a combination of the channel simulation methods described above for the forward and reverse links, and the movement of SMT state information between host MTSs, described in 4.4.1 (SDR Functional Architecture) and 4.7.1 (Handoff). The connections between BTSs and MTSs are set up to model a geographical layout (e.g. where some BTSs are "closer" or "farther" from a SMT than others). An SMT executing on a specific MTS can communicate with the BTSs that are "close" and it can detect BTSs that are "far". Controller (102) through appropriate messages to the MTS, can get an SMT to report that a "far" BTS is getting "closer". When the network directs the SMT to use the "far" BTS signal, the execution of the SMT is moved to an MTS that is "close" to the BTS by moving that SMT's state information to the "close" MTS.

Operating concurrently with this migration of the SMT state information between host MTSs, is the channel simulation for the mobility of the SMT within the "close" BTSs.

4.7.4 Mobile Equipment Simulation

Within a given wireless technology, there are often multiple revisions of the standards that define acceptable mobile behaviour. These revisions are often mutually compatible. For example, within CDMA, 7 protocol revision levels are defined, and the network equipment typically is designed to handle MTs that conform to different revisions. When such revisions are mutually compatible, multiple implementations can coexist within a single MTS. So for example, a single MTS programmed for CDMA, can host several SMTs operating at various of Protocol Revisions 1 through 7.

When the revisions are not compatible, or when different technologies need to be simulated, multiple, coordinated MTSs can be used. Each can be programmed for the desired wireless technologies. Controllers (1302) and (1308) in FIG. 15, would insure that SMTs execute on the MTSs that were configured for the appropriate technology.

4.8 Channel Simulation with Test Scripts

Channel simulation is performed on a per-SMT and per-BTS sector-carrier basis, within the host MTS(s) in real-time. A user application, through Controller (102), creates/instantiates multiple SMTs in host MTSs in conjunction with scenario/channel simulation engine (203), as shown in FIGS. 2, 8, 9 and 11, and a test script.

In summary, a test script is defined by the user application acting through Controller (102), using a library of channel profiles. After definition, a test script is assigned by Controller (102) to an SMT on a host MTS, and then activated according to the user application. Upon activation, the test script is executed by the host MTS for the assigned SMT, and thereby generates the real-time channel condition based on the temporal adjustment of channel simulation parameters according to the channel profile then in "control", all according to the test script.

The terms and concepts in the preceding summary, are explained, next.

A test script is a sequence of channel profiles plus power control commands, (S)MT configuration parameters, and general simulation definitions (e.g. the number of SMTs). A test script defines the channel simulation for an SMT with respect to every channel seen by every MTS. A test script can be written in any suitable, conventional programming language.

A channel profile is a time-varying vector of the channel simulation parameters. A channel profile may include a simple simulation (e.g. a flat fade) or a complex one. A channel profile is a subset of an SMT's state information (which contains, for example, contextual information that the SMT has (and needs to have) about its operating environment in the host MTS). A library of channel profiles is known to Controller (102) and the MTSs.

Channel simulation parameters are defined per-SMT and per BTS sector-carrier. Certain static parameters are required (e.g. the calibrated transceiver conversion gain and connection loss between each BTS sector and the MTSs in the CDMA2000 context). Furthermore, for each SMT-BTS sector combination, channel simulation advantageously includes parameters for: (a) mean path loss (MPL), (b) large-scale fading loss, (c) small-scale fading loss, and (d) lumped-parameter phase rotation.

MPL is defined by configuration parameters and real-time parameters. MPL configuration parameters include: SMT antenna gain, SMT instantaneous band class, SMT instantaneous carrier frequency, and the applicable MT Class. MPL real-time parameters include: BTS sector antenna gain, BTS-SMT line of sight distance, BTS sector raw pilot strength(s) and BTS sector raw output power.

Large-scale fading is due to propagation impairments that are large compared to the carrier wavelength. Examples of large-scale fading include effects from buildings or terrain. Small-scale fading is due to propagation impairments that are small compared to the carrier wavelength and introduce effects like multipath and Doppler.

These channel simulation parameters allow the support of various non-frequency-selective fading models, to be introduced as optional features. A fading model may include parameters that are static and real-time. They provides a mechanism to describe, select, and "playback" a fading model as independently assigned to each SMT.

A library of channel profiles can be developed for simulating a host of channel impairments, as can scripts comprising such channel profiles, and in conjunction with appropriate hardware and software rendered in accordance with this invention, commercialization thereof can be effected through licensing.

The assignment of a test script involves a significant transfer of data from Controller (102) to host MTS(s) via scenario/channel simulation engine (203) in FIG. 2. Although the transfer is done though a high throughput communications link, current implementing technologies do not yet permit a real-time playback of a test script directly from Controller (102) to the host MTS. A test script must first be defined and then assigned/transferred to a host MTS (for a particular hosted SMT) via engine (203), and only at that point can it be activated. But in principle, there is nothing in this invention that precludes future implementing technologies to permit such direct real-time playback and this invention should not be limited thereby.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

Without limiting the generality of the foregoing disclaimer of limitations, the following observations are made in the spirit of such disclaimer.

While the preferred embodiment disclosed here implements a MTS for the CDMA2000 1x standard, other known or forthcoming standards such as GSM, UTS and 3x may be implemented in a similar fashion. The invention applies concepts of SDR, in particular reconfigurability, to the problem of high-density, large-scale, self-contained simulation of MTSs. Furthermore, the concept of simulating all possible RF propagation paths between a plurality of BTSs and their sectors, and a plurality of SMTs in the baseband is a general concept of this invention applicable to any present or future cellular standard. By reconfiguring the baseband processing algorithms and protocol engines of all or a subset of SMTs, the invention is immediately adaptable to a different cellular standard.

Although the preferred embodiment discloses the connection to a "real" BTS (e.g. operator's equipment), the relevant signals thereof can be provided by equipment that provides all the functionality of a "real" BTS that is relevant to the user application (e.g. by a personal computer) or part of that functionality (e.g. a personal computer and/or peripherals connected to the BTS). In this way, BTS functions relevant to the user application can, in whole or in part, be simulated.

Although the preferred embodiment discloses the connection to a BTS (101), there is no limitation to such an infrastructure device. The invention is equally applicable to a network access points in communication paradigms like IEEE 802.11 or Bluetooth.

Although both the forward and reverse links have been described in the preferred embodiment, it is also meaningful for certain testing purposes to maintain-only the forward link (e.g. testing capacity for BTS to send out broadcast signals).

We claim:

1. A system to test a portion of a wireless communication network that provides a plurality of forward signals, comprising:
    means for accepting said plurality of forward signals in a forward link, and for returning a plurality of reverse signals in a reverse link to the tested network portion that are suitable for direct input thereto without requiring modifications;
    wherein said plurality of reverse signals has the properties of an equivalent signal that would be produced by a plurality of mobile terminals communicating with said tested network portion through a plurality of independent forward link channels and reverse link channels.

2. The system of claim 1, wherein said accepting and returning means for simulating a plurality of MTs implemented on a generic, communications protocol-agnostic SDR hardware platform;
    said plurality of SMTs behave as would real MTs in the presence of said forward link that includes the macroscopic effects of forward channel impairments; and
    said reverse link includes the macroscopic effects of reverse channel impairments achieved by performing certain calculations on the baseband signal.

3. The system of claim 2, wherein said reverse link is effected by simulating the effects of impairments to each said reverse channel as introduced into some part of the transmitting chain of each said SMT.

4. The system of claim 2, wherein said channel impairment includes the simulation of mobility of at least one SMT corresponding to the physical movement of a MT.

5. The system of claim 4, wherein said channel impairments reflect features of a specific physical environment.

6. The system of claim 5, wherein, for each SMT-sector combination, said channel impairment includes the simulation of one of, {(a) mean path loss (MPL), (b) large-scale fading loss, (c) small-scale fading loss, (d) lumped-parameter phase rotation and (e) time delay}.

7. The system of claim 6, wherein MPL is defined by configuration parameters and real-time parameters.

8. The system of claim 7, wherein MPL configuration parameters include one of {SMT antenna gain, SMT instantaneous band class, SMT instantaneous carrier frequency, and the applicable MT Class}.

9. The system of claim 8, wherein MPL real-time parameters include one of {BTS sector antenna gain, BTS-SMT line of sight distance, BTS sector raw pilot strength(s) and BTS sector raw output power}.

10. The system of claim 6, wherein small-scale loss is due to propagation impairments that are small compared to the carrier wavelength to introduce effects like multipath and Doppler effects.

11. The system of claim 4, wherein mobility simulation is effected by providing the functions of a second basestation, and said two bastations are coordinated, in conjunction with one said SMT whose simulated signals are characterized in the RF domain as an MT being in the effective transmission range of two basestations, wherein said (forward and reverse) channel simulations and pilot management are performed to effect a soft handoff.

12. The system of claim 2, further comprising a scenario/channel simulation engine for creating a real time simulation of a plurality of MTs interacting with the tested network portion.

13. The system of claim 12, comparing means for defining a script of channel impairments for said scenario/channel simulation engine.

14. The system of claim 13, further comprising means for assigning said defined script to a SMT/MTS.

15. The system of claim 14, further comprising means for activating said assigned script.

16. The system of claim 15, wherein groups of SMTs are scripted to perform similarly.

17. The system of claim 2, wherein said simulation includes the sharing of functions and processing steps of SMTs during baseband processing.

18. The system of claim 17, wherein said simulation is effected by simulating all RF paths between said basestation and a plurality of SMTs, by combining and scaling all individual RF carriers.

19. The system of claim 18, wherein said first basestation functions are sectorized, and where in the forward direction, the received signals R at an SMT is the product of gain G and sector signals S, where G is adjusted to reflect impairments such as time varying propagation paths in the RF domain.

20. The system of claim 19, wherein in said forward link, said channel simulation includes mathematically approximating channel impairments.

21. The system of claim 20, wherein said approximating is done by sampling at granularity of chip-rate.

22. The system of claim 20, wherein said approximating is done by sampling at granularity of power control rate.

23. The system of claim 20, wherein said approximating is done by sampling at granularity of frames or groups of symbols.

24. The system of claim 20 wherein said approximating is done by sampling at power control rate for one channel and chip rate simulation for another channel.

25. The system of claim 2, where in said forward link, said channel simulation includes scaling of the energy contribution of each basestation sector and the interference levels.

26. The system of claim 2, wherein in said forward or reverse link, said channel simulation includes calculating elements of one of said communication protocols.

27. The system of claim 26, wherein one said calculated element is the desired pilot strength Ec/Io at each SMT being calculated once and sent to all SMTs (instead of being measured by each SMT).

28. The system of claim 27, where the calculation is by appropriate sector scaling G.

29. The system of claim 28, wherein in said reverse link, said channel simulation combines power control and channel simulation ($G'=G \times R/R0$) where $R=KR0$.

30. The system of claim 2, where all demodulation and decoding of shared channels for all SMTs is done by a single, shared hardware/firmware resource.

31. The system of claim 30, where in the distribution of symbols in all SMTs is only indirectly simulated as BER, and where relative sector power (pilot strength) does not actually change when simulating soft(er) handoff.

32. The system claim 31, wherein the reverse links of a plurality of a plurality of SMTs operating on the same carrier are combined at baseband and the subsequent combined signal is filtered and digitally upconverted to an IF or the desired RF.

33. The system of claim 32, wherein the combination and accumulation is distributed among the individual SMTs connected by a multiplex bus or tree.

34. The system of claim 2, wherein said SMT simulation means includes a MT simulator (MTS) being a software/hardware cradle for hosting a SMT.

35. The system of claim 34, further comprising controller means, in a communication link with said MTS, for instantiating a SMT in said MTS.

36. The system of claim 35, where said MTS is directly connected to BTS sector ports.

37. The system of claim 36, wherein for a BTS having n sectors, a MTS has at least n+1 connections.

38. The system of claim 34, wherein said SMT has state information for it to operate within a MTS.

39. The system of claim 38, wherein said communications link between said MTS and said controller means has a throughput capability greater than that in a typical MT/BTS communications.

40. The system of claim 39, wherein said controller means can send override commands to the SMT/MTS, for creating conditions that are abnormal for a properly operating MT.

41. The system of claim 1 or 2, wherein said forward link is effected by simulating the effects of impairments to each said channel as introduced into some part of the receiving chain of each said SMT.

42. The system of claim 1, wherein the tested network portion includes means for producing network access point functions.

43. The system of claim 1, wherein the tested network portion includes means for producing functions of a first basestation.

44. The system of claim 1, wherein two of said channels operate on different communications protocols.

45. The system of claim 44, where one of the protocols is one of {FDMA, CDMA, W-CDMA, UMTS and derivatives thereof}.

46. The system of claim 1, wherein signals transmitted on two of said channels are the subject of different encoding and decoding methods.

47. The system of claim 1, wherein signals transmitted on two of said channels are carried on different frequencies.

48. The system of claim 1, wherein two of said channels have different bandwidths.

49. The system of claim 1, wherein said channel simulations are effected in part by the application of an impairment of said forward link or said reverse link of one said channel.

50. The system of claim 1 wherein the tested network portion includes means for providing the functions of a second basestation and further comprises means for simulating two-way communications between said second basestation function means, and one of said plurality of SMTs.

51. The system of claim 50, further comprising means for coordinating and controlling said first and second basestation function means.

52. The system of claim 50, wherein said MTS is in direct communication with said two basestations.

53. The system of claim 52, wherein said moving is accomplished by instantiating the SMT in the second MTS by copying state information from first MTS to second MTS.

54. The system of claim 50, comprising a plurality of MTSs and a plurality of basestations, wherein each said MTS is in direct communication with at least two of said basestations, and where mobility simulation is effected by moving one said SMT from one said MTS to a second said MTS.

55. The system of claim 1, wherein said forward link channel includes the following sequential steps:

(a) processing RF to digital baseband
(b) processing digital baseband to chip
(c) processing chips to symbols
 (I) sector scaling and combining
 (II) chip-rate channel simulation
 (III) power-control rate channel simulation
(d) processing symbols to frames.

56. The system of claim 1, wherein said reverse link channel includes the following sequential steps:

(a) processing frames to symbols
(b) processing symbols to spread signals
(c) channel simulation, sector scaling and combining
 (I) channel simulation
 (II) combined power control and channel simulation
 (III) sector scaling and combining
(d) processing chips to RF.

57. The system of claim 1, wherein a channel profile is created to be a time-varying vector of channel simulation parameters.

58. The system of claim 57, wherein channel simulation parameters include those for simple and complex fading.

59. The system of claim 57, wherein channel simulation parameters are created on a per-SMT and per BTS sector basis.

60. The system of claim 59, wherein for each SMT-sector combination, channel simulation includes one of {(a) mean path loss (MPL), (b) large-scale fading loss, (c) small-scale fading loss, and (d) lumped-parameter phase rotation and (e) time delay}.

61. The system of claim 60, wherein MPL is defined by configuration parameters and real-time parameters.

62. The system of claim 61, wherein MPL configuration parameters include: SMT antenna gain, SMT instantaneous band class, SMT instantaneous carrier frequency, and the applicable MT Class).

63. The system of claim 61, wherein MPL real-time parameters include: BTS sector antenna gain, BTS-SMT line of sight distance, BTS sector raw pilot strength(s) and BTS sector raw output power.

64. The system of claim 63, wherein small-scale fading is due to propagation impairments that are small compared to the carrier wavelength and introduce effects like multipath and Doppler.

65. The system of claim 57, wherein static channel simulation parameters include one of the following: {calibrated transceiver conversion gain and connection loss between each BTS sector and the SMT}.

66. The system of claim 1, further comprising means for interfacing with test equipment.

67. The system of claim 1 comprising means for interfacing with a PC.

68. The system of claim 1, further comprising an antenna and wherein said SMT is connected to said antenna.

69. The method of testing a portion of a wireless communication network that provides a plurality of forward signals, comprising the steps of:

accepting said plurality of forward signals in a forward link, and returning a plurality of reverse signals in a reverse link to the tested network portion that are suitable for direct input thereto without requiring modification;

wherein said plurality of reverse signals has the properties of an equivalent signal that would be produced by a plurality of mobile terminals communicating with said tested network portion through a plurality of independent forward link channels and reverse link channels.

* * * * *